(12) United States Patent
Kimura

(10) Patent No.: US 8,094,474 B2
(45) Date of Patent: Jan. 10, 2012

(54) DRIVE CONTROLLER FOR POWER CONVERSION CIRCUIT

(75) Inventor: Tomonori Kimura, Oobu (JP)

(73) Assignee: Denso Corporation, Kariya (JP)

( * ) Notice: Subject to any disclaimer, the term of this patent is extended or adjusted under 35 U.S.C. 154(b) by 209 days.

(21) Appl. No.: 12/396,689

(22) Filed: Mar. 3, 2009

(65) Prior Publication Data
US 2009/0219001 A1 Sep. 3, 2009

(30) Foreign Application Priority Data
Mar. 3, 2008 (JP) .................. 2008-051765

(51) Int. Cl.
*H02M 7/5387* (2007.01)
*H02M 5/42* (2006.01)
*H02M 7/68* (2006.01)
*H02M 3/24* (2006.01)

(52) U.S. Cl. ........................................ 363/132; 363/98

(58) Field of Classification Search .................... 363/97, 363/98, 132; 318/139, 254, 400.3, 400.25
See application file for complete search history.

(56) References Cited

U.S. PATENT DOCUMENTS

| | | | | |
|---|---|---|---|---|
| 4,745,755 A * | 5/1988 | Kawamura | ..................... | 60/608 |
| 5,302,858 A * | 4/1994 | Folts | ..................... | 307/66 |
| 6,573,664 B2 * | 6/2003 | Shen | ..................... | 315/247 |
| 6,670,779 B2 | 12/2003 | Shen | | |
| 7,259,530 B2 * | 8/2007 | Ochiai et al. | ..................... | 318/105 |
| 7,786,690 B2 * | 8/2010 | Hoda | ..................... | 318/599 |
| 2004/0027101 A1 | 2/2004 | Vinciarelli | | |
| 2005/0218876 A1 | 10/2005 | Nino | | |

FOREIGN PATENT DOCUMENTS

| | | |
|---|---|---|
| JP | 2004-166484 | 6/2004 |
| JP | 2005-512491 | 4/2005 |
| JP | 2005-295671 | 10/2005 |

OTHER PUBLICATIONS

Japanese Office Action dated Jan. 12, 2010, issued in corresponding Japanese Application No. 2008-051765, with English translation.

* cited by examiner

*Primary Examiner* — Adolf Berhane
*Assistant Examiner* — Emily Pham
(74) *Attorney, Agent, or Firm* — Nixon & Vanderhye P.C.

(57) ABSTRACT

A drive controller is provided, for controlling driving of a power conversion circuit. The power control circuit includes a switching element for increasing/decreasing an absolute value of current passing through a coil by repeating electrical ON/OFF operation, so that voltage of power storage means is converted to a desired value required by power supply means, the switching element being provided for each positive/negative polarity of output current outputted from a circuit other than the power storage means, to the power storage means. Meanwhile, the drive controller includes energy loading means and OFF-state setting means. The energy loading means loads energy on the coil through a switching element not corresponding to existing polarity of the output current, after the absolute value has been zeroed by the turn OFF of the switching element corresponding to the existing polarity, but preceding an ON operation of the switching element corresponding to the existing polarity. The OFF-state setting means set both of the switching elements corresponding to and not corresponding to the existing polarity to an OFF state, after the energy loading process.

19 Claims, 25 Drawing Sheets

FIG.4
(a) OUTPUT CURRENT iC > 0
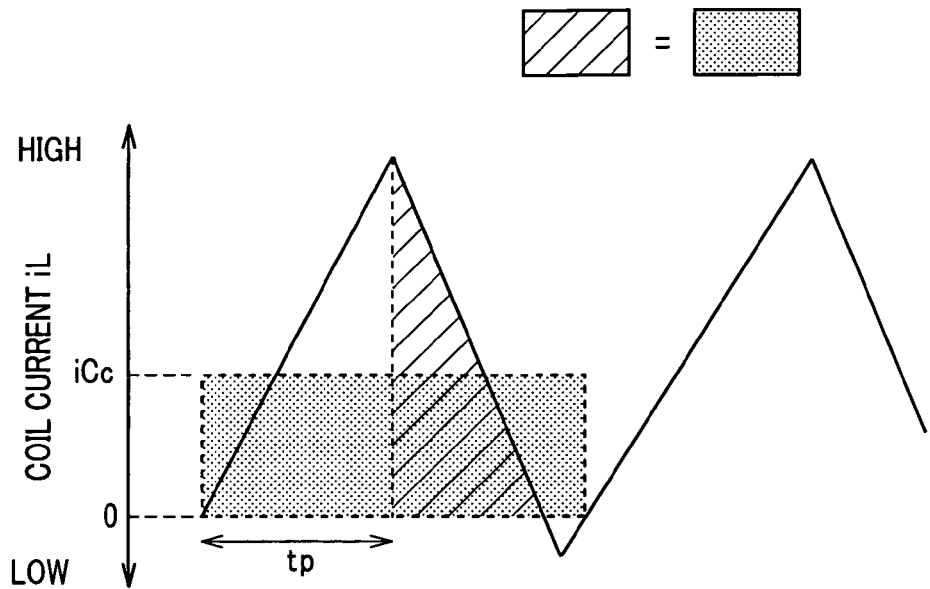
(b) OUTPUT CURRENT iC < 0
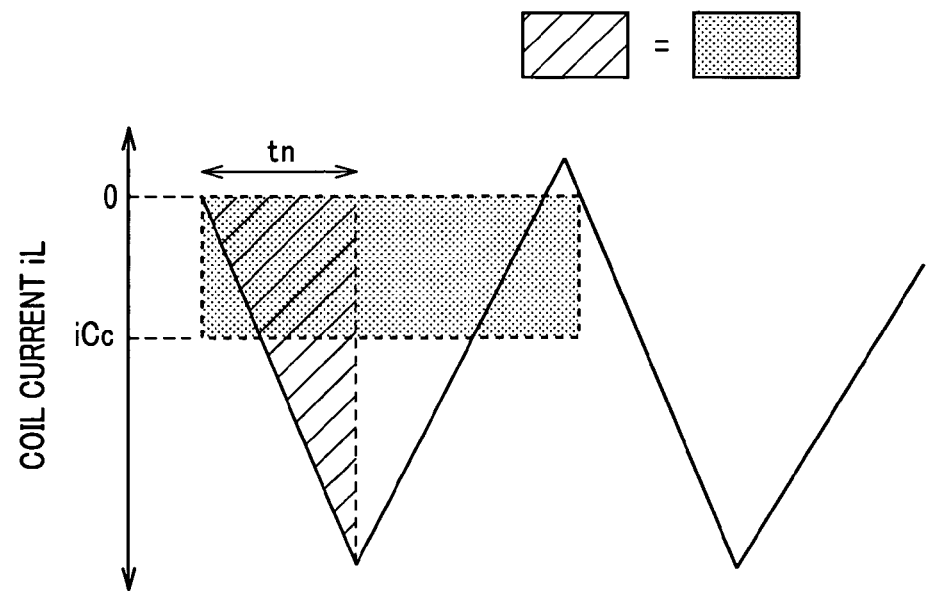

DRIVE CONTROLLER FOR POWER CONVERSION CIRCUIT

CROSS-REFERENCE TO RELATED APPLICATION

This application is based on and claims the benefit of priority from earlier Japanese Patent Application No. 2008-51765 filed on Mar. 3, 2008, the description of which is incorporated herein by reference.

BACKGROUND OF THE INVENTION

1. Technical Field of the Invention

The present invention relates to a drive controller for controlling driving of a power conversion circuit, and to a drive control system, and in particular, to a drive control circuit which is provided with a power ON/OFF electrical switching element and is suitable for a power conversion circuit that uses a technique of converting voltage with the operation of the switching element, and to a drive control system equipped with the power conversion circuit and the drive controller.

2. Related Art

Known electrode conversion circuits include one which is provided with a switching element that can be electrically turned ON/OFF. Such a conversion circuit is configured such that the switching element is repeatedly turned ON/OFF to increase/decrease the absolute value of the current passing through the coil. With this repeated operation, voltage of the power storage means is converted to the voltage having a desired value as requested by the power supply means.

Generally, in a drive controller used for such a power conversion circuit, a parasitic capacitor is electrically connected parallel to the input/output terminals of the switching element. Therefore, when the switching element is switched from an OFF state to an ON state, short circuit may occur, via the switching element, between the electrodes of the parasitic capacitor. For this reason, if the parasitic capacitor has been charged when the state is switched to an ON state, this switch-ON operation will permit the charges of the parasitic capacitor to pass through the switching element, by which power loss may be caused.

Under the circumstances, some measures have been taken, as can be seen in Japanese Patent Application Laid-Open Publication No. 2005-512491, for example. This reference suggests that, after the current that passes through the coil of a power conversion circuit has been zeroed, a predetermined standby time is given preceding the switch-ON operation. Thus, when current is passed through the closed loop circuit including the coil and the parasitic capacitor, the charges of the parasitic capacitor can be extracted.

The amount of charges extracted from the parasitic capacitor when current is passed through the closed loop circuit, depends on the voltage (input voltage) of the power supply means and the voltage (output voltage) of the power storage means of the power conversion circuit. Therefore, depending on the relationship between the input voltage and the output voltage, not all the charges of the parasitic capacitor can be extracted. In this case, flow of charges of the parasitic capacitor through the switching element in switching the state of the switching element to an ON state, can cause power loss.

SUMMARY OF THE INVENTION

The present invention has been made in order to resolve the problems mentioned above, and has as its object to provide a drive controller for a power conversion circuit, which is able to reliably reduce power loss accompanying an ON operation of a switching element, in converting voltage of power storage means by increasing/decreasing an absolute value of the current passing through a coil with repeated ON/OFF operation of the switching element, and to provide a drive control system.

In order to achieve the above object, the drive controller related to the present invention comprises a switching element for increasing/decreasing an absolute value of current passing through a coil by repeating electrical ON/OFF operation, so that voltage of power storage means is converted to a desired value required by power supply means, the switching element being provided for each positive/negative polarity of output current outputted from a circuit other than the power storage means, to the power storage means, wherein the controller comprises: energy loading means for loading energy on the coil through a switching element not corresponding to existing polarity of the output current, after the absolute value has been zeroed by the turn OFF of the switching element corresponding to the existing polarity, but preceding an ON operation of the switching element corresponding to the existing polarity; and OFF-state setting means for turning OFF both of the switching elements corresponding to and not corresponding to the existing polarity, after the energy loading process.

Conventionally, after the current passing through a coil has been zeroed, but preceding an ON operation of a switching element corresponding to existing polarity, a standby time has been given for a while to reduce the voltage across the input/output terminals of the switching element. However, this may not fully reduce the voltage across the input/output terminals of the switching element. In this regard, according to the present invention, if energy is loaded on a coil through the switching element not corresponding to the existing polarity after the current passing through the coil has been zeroed, the voltage across the input/output terminals of the switching element corresponding to the existing polarity may be adequately reduced using the energy loaded on the coil by the turn OFF of both of the switching elements with the OFF-state setting means.

Meanwhile, current flows through the coil when energy is loaded on the coil via the switching element not corresponding to the existing polarity. In this case, the current flows in the direction opposite to the direction of the flow of the current immediately before the absolute value is zeroed. When energy is loaded on a coil via the switching element not corresponding to the existing polarity, a peak value of the opposite-direction current becomes larger than in the case where the switching element not corresponding to the existing polarity has not been used.

Also, in this case, current flows through a closed loop circuit including capacitor components and the coil when both of the switching elements are turned OFF by the OFF-state setting means, the capacitor components being parallel to the input/output terminals of the switching element corresponding to the existing polarity. This current flow may produce a phenomenon of extracting the charges of the capacitor components.

The power conversion circuit may have a feature of including a pair of serially connected switching elements corresponding to the respective polarities of the output current. With this feature, when both of the switching elements are turned OFF by the OFF-state setting means, the capacitor parallel to the input/output terminals of the switching element not corresponding to the existing polarity will be charged by the energy loaded on the coil. In addition, the charges of the capacitor parallel to the input/output terminals of the switching element corresponding to the existing polarity can be fully extracted.

Preferably, there may be further provided polarity determining means for determining polarity of the output current. The polarity determining means may properly operate the switching elements based on the polarity of the output current.

Preferably, the energy loading means may load energy on the coil when the switching element corresponding to the existing polarity is switched from an OFF state to an ON state, in order to zero the voltage applied across the input/output terminals.

Preferably, the energy loading means performs a process of loading energy on the coil based on the voltage of the power supply means and the voltage of the power storage means.

When both of the switching elements are turned OFF by the OFF-state setting means without being loaded with energy by the energy loading means, the voltage across the input/output terminals of the switching element corresponding to the existing polarity will be reduced. The degree of the reduction depends on the voltage of the power supply means and the voltage of the power storage means. Accordingly, the amount of loading energy required in fully reducing the voltage across the input/output terminals of the switching element corresponding to the existing polarity depends on the voltage of the power supply means and the voltage of the power storage means. In the above invention, in light of this point, an energy loading process is performed based on the voltage values, so that the voltage across the input/output terminals of the switching element corresponding to the existing polarity may be adequately reduced.

Also, the energy loading means may comprise setting means for setting time for retaining an ON state of the switching element not corresponding to the existing polarity of the output current, starting from the time point when the absolute value has been zeroed by the turn OFF of the switching element corresponding to the existing polarity. It is after the current of the coil is lowered by the increase/decrease processing of the absolute value and temporarily zeroed, that energy can be loaded on the coil via the switching element not corresponding to the existing polarity. The above invention pays attention to this point. Specifically, proper energy is loaded on the coil by using the time point when the absolute value is zeroed, as a starting point. In this loading of energy, the above invention is able to properly set time necessary for retaining the ON state of the switching element not corresponding to the existing polarity.

Also, for example, the power conversion circuit may comprise a pair of serially connected switching elements corresponding to respective polarities of the output current; voltage across input/output terminals of the switching element corresponding to the existing polarity is set so as to be zeroed, by charged voltage of capacitor components parallel to the input/output terminals of the switching element not corresponding to the existing polarity, preceding the switching of the switching element corresponding to the existing polarity from an ON state to an OFF state; and the energy loading means is configured to load energy for extracting charges from the capacitor components parallel to the input/output terminals of the switching element corresponding to the existing polarity, when the switching element is switched from an OFF state to an ON state.

In this case, the presence of the capacitor components may contribute to well reduce the voltage, in advance, across the input/output terminals of the switching element corresponding to the existing polarity, when the switching element is switched from an ON state to an OFF state. However, with the presence of the capacitor components, short circuit may be caused between both electrodes of the capacitor by performing switching from an OFF state to an ON state, leading to discharge of capacitor and thus to power loss. In this way, capacitor components are useful in performing switching from an ON state to an OFF state, but can be a factor of causing power loss in performing switching from an OFF state to an ON state. In this regard, since the above invention is provided with the energy loading means and the OFF-state setting means, charges of the capacitor can be properly extracted preceding the switching from an OFF state to an ON state, leading to reduction of power loss.

Other advantages and effects brought about by the drive controller related to the present invention will be clarified by the description, referring to the accompanying drawings, on the embodiments provided later.

On the other hand, the drive control system related to the present invention a power conversion circuit comprising a switching element for increasing/decreasing an absolute value of current passing through a coil by repeating electrical ON/OFF operation, so that voltage of power storage means is converted to a desired value required by power supply means, the switching element being provided for each positive/negative polarity of output current outputted from a circuit other than the power storage means, to the power storage means; and a drive controller for controlling driving of the power conversion circuit, wherein the drive controller comprises: energy loading means for loading energy on the coil through a switching element not corresponding to existing polarity of the output current, after the absolute value has been zeroed by the turn OFF of the switching element corresponding to the existing polarity, but preceding an ON operation of the switching element corresponding to the existing polarity; and OFF-state setting means for turning OFF both of the switching elements corresponding to and not corresponding to the existing polarity, after the energy loading process.

BRIEF DESCRIPTION OF THE DRAWINGS

In the accompanying drawings:

FIG. 4 is a time diagram illustrating a mode of setting ON time of a switching element, according to the first embodiment;

DETAILED DESCRIPTION OF THE PREFERRED EMBODIMENTS

First Embodiment

With reference to FIGS. 1 to 14, hereinafter will be described a first embodiment of the present invention.

In the present embodiment, an explanation is given taking as an example a case where a drive controller for a power conversion circuit and a drive control system of the present invention are applied to a control unit of a motor that is a motive power generator for a hybrid vehicle.

Figure 1:
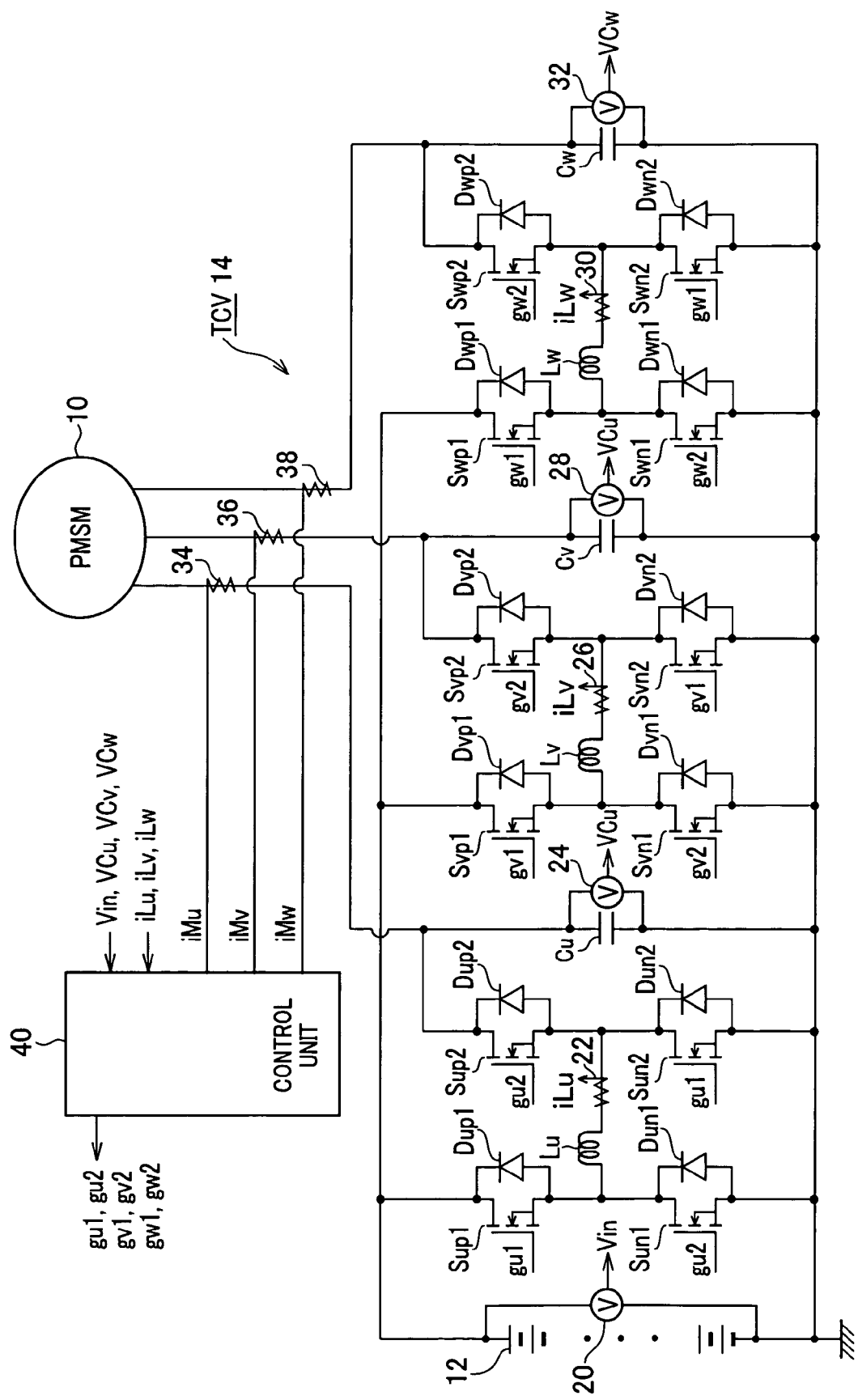
FIG. 1 is a schematic diagram illustrating a system according to a first embodiment of the present invention.

FIG. 1 is a schematic diagram illustrating a general configuration of the drive control system according to the present embodiment.

A motor 10 is a motive power generator for a hybrid vehicle, which, here, is exemplified as a permanent magnet sync motor (PMSM). The motor 10 is connected to a high-voltage battery 12 via a three-phase converter (TCV 14) as a power conversion circuit. The high-voltage battery 12 is a storage battery, such as a nickel hydrogen battery and a lithium ion battery.

The TCV 14 is configured, being provided with DC-DC converters to be connected to the individual phases of the motor 10 to continuously adjust the voltage applied to the individual phases. Specifically, the TCV 14 of the present embodiment is configured, being provided with non-inverting back-boost converters for the individual phases. More specifically, phase "U" has a DC-DC converter including a serially connected switching elements Sup1, Sun1 which are parallelly connected to the high-voltage battery 12, a capacitor Cu connected between phase "U" of the motor 10 and the ground, serially connected switching elements Sup2, Sun2 which are parallelly connected to the capacitor Cu, and a coil Lu connecting between nodes of the above two respective serial connections. In the present embodiment, power MOS-FETs are employed as the switching elements Sup1, Sun1, Sup2, Sun2. Diodes Dup1, Dun1, Dup2, Dun2 are connected parallel to the switching elements Sup1, Sun1, Sup2, Sun2, respectively. The parallelly connected diodes Dup1, Dun1, Dup2, Dun2 may be body diodes, such as power MOSFETs. Phases "V" and "W" of the TCV 14 are also each configured by being provided with the DC-DC converters of the same configuration.

The above control system includes the following means for detecting various inside conditions of the system. First, the system is provided with a voltage sensor 20 for sensing the voltage of the high-voltage battery 12. The U-phase part of the TCV 14 includes a current sensor 22 for sensing the current passing through the coil Lu and a voltage sensor 24 for sensing the voltage of the capacitor Cu. On the other hand, the V-phase part of the TCV 14 includes a current sensor 26 for sensing the current passing through a coil Lv, and a voltage sensor 28 for sensing the voltage of a capacitor Cv. The W-phase part of the TCV 14 includes a current sensor 30 for sensing the current passing through a coil Lw and a voltage sensor 32 for sensing the voltage of a capacitor Cw. Further, current sensors 34, 36 and 38 are provided for sensing the current of the individual phases of the motor 10.

Meanwhile, a control unit 40 plays a roll of controlling the motor 10. Specifically, the control unit 40 retrieves the detection values from the above various sensors and operates the TCV 14 based on these values. More specifically, the control unit 40 produces an operation signal "gu1" for operating the switching elements Sup1, Sun2, an operation signal "gu2" for operating the switching elements Sun1, Sup2, an operation signal "gv1" for operating the switching elements Svp1, Svn2, an operation signal "gv2" for operating the switching element Svn1, Svp2, an operation signal "gw1" for operating the switching elements Swp1, Swn2, and an operation signal "gw2" for operating the switching elements Swn1, Swp2. Using these, the control unit 40 performs chopper control to thereby convert the voltage of the high-voltage battery 12 to the voltage of a desired value for application to the capacitors Cu, Cv, Cw.

Figure 2:
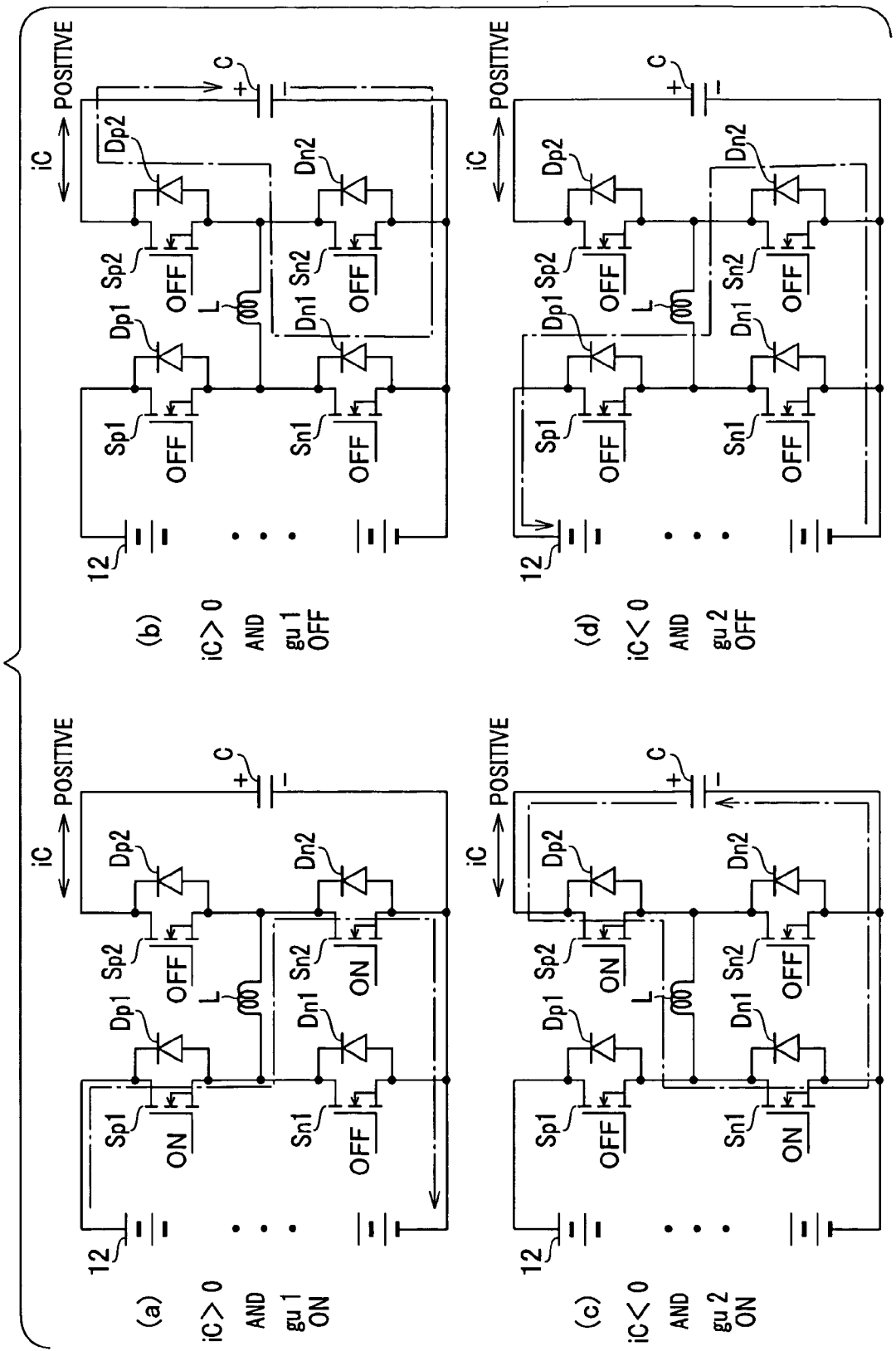
FIG. 2 is a view illustrating a mode of increase/decrease operation for coil current, according to the first embodiment.

FIG. 2 illustrates a mode of generally used chopper control in controlling the voltage of the capacitors Cu, Cv, Cw. It should be appreciated that FIG. 2 shows only one of the three DC-DC converters configuring the TCV 14. Also, FIG. 2 uses reference symbols removed with alphabets corresponding to phases from the reference symbols of the individual elements. In particular, for example, the switching elements Sup1, Svp1, Swp1 are represented by a switching element Sp1. For the convenience of explanation, FIG. 2 shows a case where the inflow and outflow of charges are as small as a level that can be ignored, between the terminals of a capacitor C and the motor 10 connected to the capacitor.

Hereinafter are explained processes of some cases, according to polarity symbols (positive and negative) of the current (output current) outputted to the side of the capacitor C from other circuit portion of the DC-DC converter than the capacitor C. First of all, referring to (a) and (b) of FIG. 2, an explanation is provided on a process in the case where the polarity of output current "iC" is positive. As shown in FIG. 2 by (a), when the operation signal "gu1" has risen to switch ON the switching elements Sp1, Sn2, current is passed through a closed loop circuit configured by the high-voltage battery 12, the switching element Sp1, a coil L and the switching element Sn2. After that, as shown in FIG. 2 by (b), when the operation signal "gu1" has fallen to switch OFF the switching elements Sp1, Sn2, back electromotive force is induced in the coil L, whereby current is passed through a closed loop circuit configured by the coil L, the diodes Dp2, the capacitor C and the diode Dn1. As a result, the capacitor C is charged.

Referring to (c) and (d) of FIG. 2, an explanation is provided on a process in the case where the polarity of the output current "iC" is negative. As shown in FIG. 2 by (c), when the operation signal "gu2" has risen to switch ON the switching elements Sp2, Sn1, current is passed through a closed loop circuit configured by the capacitor C, the switching elements Sp2, the coil L and the switching element Sn1. As a result, the charges of the capacitor C are discharged. After that, as shown in FIG. 2 by (d), when the operation signal "gu2" has fallen to switch OFF the switching elements Sp2, Sn1, back electromotive force is induced in the coil L, whereby current is passed through a closed loop circuit configured by the coil L, the diode Dp1, the high-voltage battery 12 and the diode Dn2.

Figure 3:
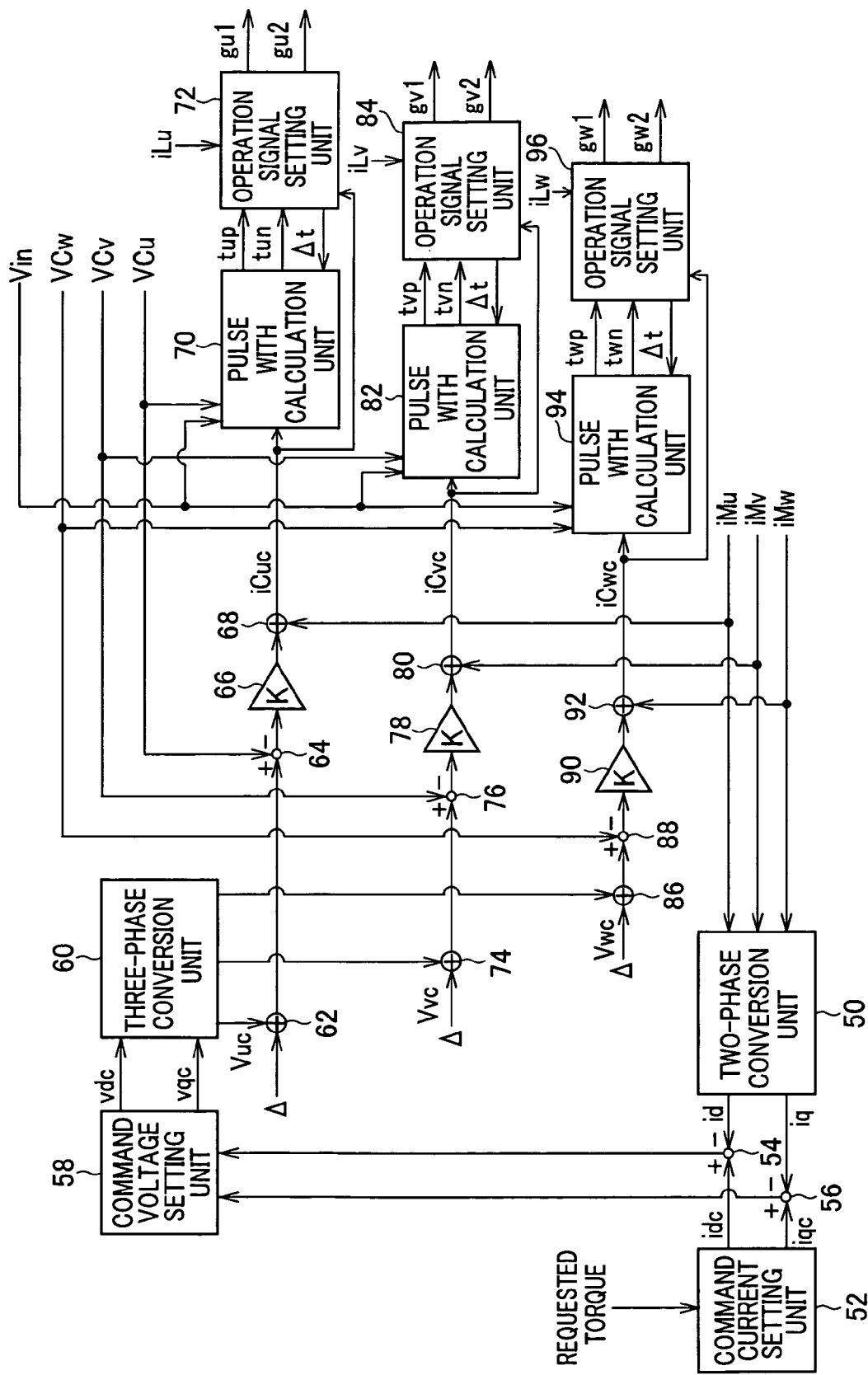
FIG. 3 is a block diagram illustrating a process associated with output voltage control, according to the first embodiment.

Thus, under the chopper control, the voltage of the DC power source (high-voltage battery 12) is converted and outputted, or in other words, the voltage of the capacitor C is adjusted. Resultantly, the value of the voltage applied to the motor 10 can turn to an analog value. Practically, however, due to the inflow/outflow of the charges between the DC-DC converter and the motor 10, a one-to-one relationship is not established between the increase or decrease of the voltage of the capacitor C and the polarity of the output current "iC". In the present embodiment, the operation signals "gu1", "gu2", "gv1", "gv2", "gw1", "gw2" are produced so that the voltage of the capacitor C can be properly controlled even under such conditions. FIG. 3 illustrates a process of producing the operation signals "gu1", "gu2", "gv1", "gv2", "gw1", "gw2".

Currents "iMu", "iMv", "iMw" of the individual phases of the motor 10 are taken into a two-phase conversion unit 50. Then, the two-phase conversion unit 50 converts the three-phase currents "iMu", "iMv", "iMw" into actual current "id" on an axis "d" and actual current "iq" on an axis "q", which correspond to currents in a two-phase rotating coordinate system. On the other hand, a command current setting unit 52 sets d-q axis command currents (command currents in the d-q axis coordinate system) "idc", "iqc" based on requested torque. A deviation calculation unit 54 calculates a difference between the command current "idc" and the actual current "id", and a deviation calculation unit 56 calculates a difference between the command current "iqc" and the actual current "iq". A command voltage setting unit 58 sets d-q axis command voltages "vdc", "vqc" based on the outputs from the deviation calculation units 54, 56. Basically, here, the actual current "id" is feedback-controlled to the command current "idc" to set a d-axis command voltage (command voltage in the d axis) "vdc", and the actual current "iq" is feedback-controlled to the command current "iqc" to set a q-axis command voltage (command voltage in the q axis) "vqc". In this case, proportional-plus-integral control, for example, may be performed as the feedback control.

A three-phase conversion unit 60 converts the d-q axis command voltages "vdc", "vqc" into three-phase command voltages "Vuc", "Vvc", "Vwc". An offset correction unit 62 performs correction by adding an offset voltage "Δ" to the U-phase command voltage "Vuc". The correction is purposed to fix the voltage polarity of the capacitor Cu, under the conditions that the command voltage "Vuc" is an AC signal of sine wave, for example, with an amplitude center being zero volt. By performing such a correction of adding the offset voltage "Δ", the voltage of the capacitor Cu is controlled so as to vary, with the offset voltage "Δ" as an amplitude center. In order to fix the polarity of the capacitor Cu, it may be satisfactory if the offset voltage "Δ" is set to a value equal to or more than the maximum amplitude of the command voltage "Vuc". However, in the present embodiment, the voltage still higher than the maximum amplitude by a specified voltage is used as the offset voltage "Δ". This setting is purposed to permit the current variation speed under the chopper control to be equal to or more than a specified speed, in light of the fact that the current variation under the chopper control is determined by the voltage of the capacitor Cu and the voltage of the high-voltage battery 12.

The command voltage "Vuc" that has been subjected to the offset correction is taken into a deviation calculation unit 64. The deviation calculation unit 64 then subtracts voltage "VCu" of the capacitor Cu, which has been sensed by the voltage sensor 24 from the output of the offset correction unit 62. The output of the deviation calculation unit 64 is taken into a feedback control unit 66 which performs proportional control. A proportional gain "K" is set here based on the capacity of the capacitor Cu and a requested voltage variation speed of the capacitor Cu. The output of the feedback control unit 66 is taken by a feedforward correction unit 68. The feedforward correction unit 68 calculates a command value of the current to be outputted to the side of the capacitor Cu and the motor 10 (output command value "iCuc"). Specifically, the feedforward correction unit 68 calculates the output command value "iCuc" by adding the current "iMu" for phase "U" to the output of the feedback control unit 66. The output command value "iCuc" corresponds to a sum of the amount of supply current for the capacitor Cu and the amount of supply current for phase "U" of the motor 10. Then, a pulse width calculation unit 70 calculates an ON time "tup" of the switching elements Sup1, Sun2, and an ON time "tun" of the switching elements Sup2, Sun1, based on the output command value "iCuc", the voltage of the high-voltage battery 12 (input voltage "Vin") and the voltage "VCu" of the capacitor Cu, so that the output current passed to the side of the capacitor Cu and the motor 10 will be the output command value "iCuc".

Similarly, as to phase "V", the command voltage "Vvc" is subjected to the offset correction with the offset voltage "Δ" in an offset correction unit 74, followed by subtraction of the voltage "VCu" of the capacitor Cv from the output of the offset correction unit 74, in a deviation calculation unit 76. Meanwhile, based on this, a feedback control unit 78 feedback-controls the voltage "VCu" of the capacitor Cv based on the command voltage "Vvc". Then, a feedforward correction unit 80 corrects the output of the feedback control unit 78 with the current "iMv" of phase "V" to thereby calculate a command value of the current passed to the side of the capacitor Cv and the motor 10 (output command value "iCvc"). Then, a pulse width calculation unit 82 calculates an ON time "tvp" of the switching elements Svp1, Svn2, and an ON time "tvn" of the switching elements Svp2, Svn1, based on the output command value "iCvc", the input voltage "Vin" and the voltage "VCu" of the capacitor Cv, so that the output current passed to the side of the capacitor Cv and the motor 10 will be the output command value "iCvc".

Similarly, as to phase "W", the command voltage "Vwc" is subjected to the offset correction with the offset voltage "Δ" in an offset correction unit 86, followed by subtraction of the voltage "VCw" of the capacitor Cw, in a deviation calculation unit 88. Meanwhile, based on this, a feedback control unit 90 feedback-controls the voltage "VCw" of the capacitor Cw based on the command voltage "Vwc". Then, a feedforward correction unit 92 corrects the output of the feedback control unit 90 with the current "iMw" of phase "W" to thereby calculate a command value of the current passed to the side of the capacitor Cw and the motor 10 (output command value "iCwc"). Then, a pulse width calculation unit 94 calculates an ON time "twp" of the switching elements Swp1, Swn2, and an ON time "twn" of the switching elements Swp2, Swn1, based on the output command value "iCwc", the input voltage "Vin" and the voltage "VCw" of the capacitor Cw.

Referring now to FIG. 4, hereinafter are specifically described the processes performed by the pulse width calculation units 70, 82, 94. In FIG. 4, the ON times "tup", "tvp", "twp" are represented by "tp", and the ON times "tun", "tvn", "twn" are represented by "tn". Also, the output currents "iCu", "iCv", "iCw" are represented by "iC".

FIG. 4 shows by (a) the current passing through the coil L (Lu, Lv, Lw) when the output current "iC" is positive. As shown, when the switching elements Sp1, Sn2 are turned ON, current passes through the circuit portion shown in FIG. 2 by (a) for gradual increase of current passing through the coil L. Then, after expiration of the ON time "tp", the switching elements Sp1, Sn2 are turned OFF. Accordingly, current passes through the circuit portion shown in FIG. 2 by (b) for gradual decrease of current "iL" of the coil L. Then, in the present embodiment, after the current "iL" passing through the coil L has been zeroed, the switching elements Sp1, Sn2 are turned ON again.

Figure 5:
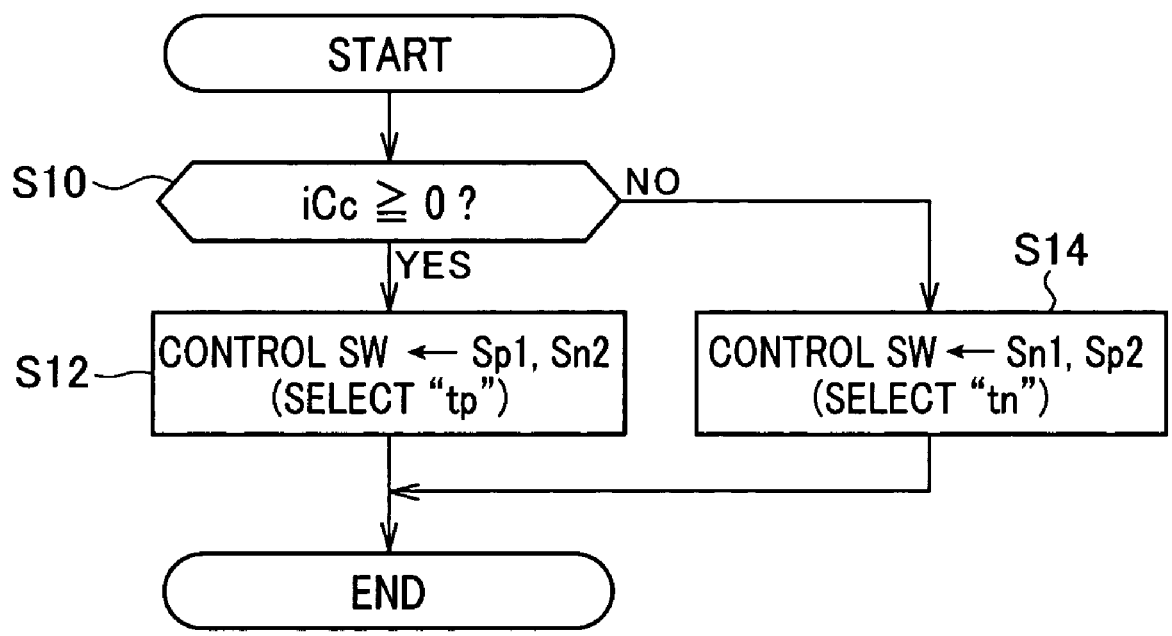
FIG. 5 is a flow diagram illustrating a procedure of a process for selecting an output voltage control switching element, according to the first embodiment.

In this regard, it is during the OFF-state period of the switching elements Sp1, Sn2 that the output current "iC" actually turns to positive, i.e. that current is passed to the side of the capacitor Cu and the motor 10. In addition, the output current "iC" will be gradually decreased. Therefore, on a microscopic time scale, the current cannot be regarded as the output command value "iCc" ("iCuc", "iCvc", "iCwc"). Therefore, in the present embodiment, an average value of the current outputted to the side of the capacitor C and the motor 10 (output current "iC") in a predetermined period is regarded as the output command value "iCc". Also, the predetermined period is set to one cycle of the ON/OFF operation of the switching elements Sp1, Sn2. FIG. 5 shows by (a) the amount of charges supplied to the side of the capacitor C and the motor 10 in terms of the diagonally shaded area. If this area becomes equal to an integration of the output command value "iCc" over one ON/OFF cycle of the switching elements Sp1, Sn2, the average of output current in one cycle, which has actually been passed to the side of the capacitor C and the motor 10 can be the output command value "iCc".

On the other hand, FIG. 4 shows by (b) the current passing through the coil L when the output current "iC" is negative. The ON time "tn" here indicates an ON time of the switching elements Sn1, Sp2. As shown, when the switching elements Sn1, Sp2 are turned ON, current passes through the circuit portion shown in FIG. 2 by (c) for gradual increase of the absolute value of the current passing through the coil L. However, of both of the electrodes of the capacitor C, the direction along which current passes to the side connected to the motor 10 is regarded as the positive direction of the current. Therefore, FIG. 4 illustrates by (c) that the current gradually decreases below zero. Then, after expiration of the ON time "tn", the switching elements Sn1, Sp2 are turned OFF, whereby current passes through the circuit portion shown in FIG. 2 by (d) for gradual decrease of the absolute value of the current passing through the coil L. Also, in the present embodiment, after the current passing through the coil L has been zeroed, the switching elements Sn1, Sp2 are turned ON again.

Here, again, the amount of charges (diagonally shaded area) extracted from the side of the capacitor C and the motor 10 in the ON time "tn" is made equal to an integration of the output command value "iCc" over one ON/OFF cycle of the switching elements Sn1, Sp2, so that an average, in a predetermined period, of the output current passed to the side of the capacitor C and the motor 10 can be the output command value "iCc".

An operation signal setting unit 72 in FIG. 2 sets either one of the operation signals "gu1", "gu2" based on either one of the ON times "tup", "tun". Also, an operation signal setting unit 84 sets either one of the operation signals "gv1", "gv2" based on either one of the ON times "tvp", "tvn". Further, an operation signal setting unit 96 sets either one of the operation signals "gw1", "gw2" based on either one of the ON times "twp", "twn". In this case, the operation signal that is set based on the ON time, corresponds to the operation signal for the switching elements for controlling the voltage (output voltage) of the capacitor C. FIG. 5 shows a procedure of a process for selecting the switching elements for controlling the output voltage.

In a series of steps, at step S10, it is determined whether or not the output command value "iC" is positive. Then, if the value is determined as being positive, the switching elements Sp1, Sn2 are permitted, at step S12, to serve as output voltage control switching elements, and thus the ON time "tp" is selected. Meanwhile, if a negative determination is made at step S10, the switching elements Sn1, Sp2 are permitted, at step S14, to serve as the output voltage control switching elements, and thus the ON time "tn" is selected.

Thus, the output voltage control switching elements are selected in the mode explained above, and the operation signals are set for the selected switching elements, based on the ON times "tp", "tn". Thus, the output current "iC" can be the output command value "iCc".

The switching elements Sp1, Sp2, Sn1, Sn2 are each formed with a parasitic capacitor parallel to the input/output terminals (source and drain). Therefore, if the parasitic capacitors have been charged with charges when the switching elements Sp1, Sp2, Sn1, Sn2 are to be switched from an OFF state to an ON state, switching in the state where voltage is zeroed between the input/output terminals (zero-volt switching), cannot be conducted. In this case, switching to the ON state can cause power loss which is ascribed to the discharge of the charges by the parasitic capacitors. The details on this are described below.

Figure 6:
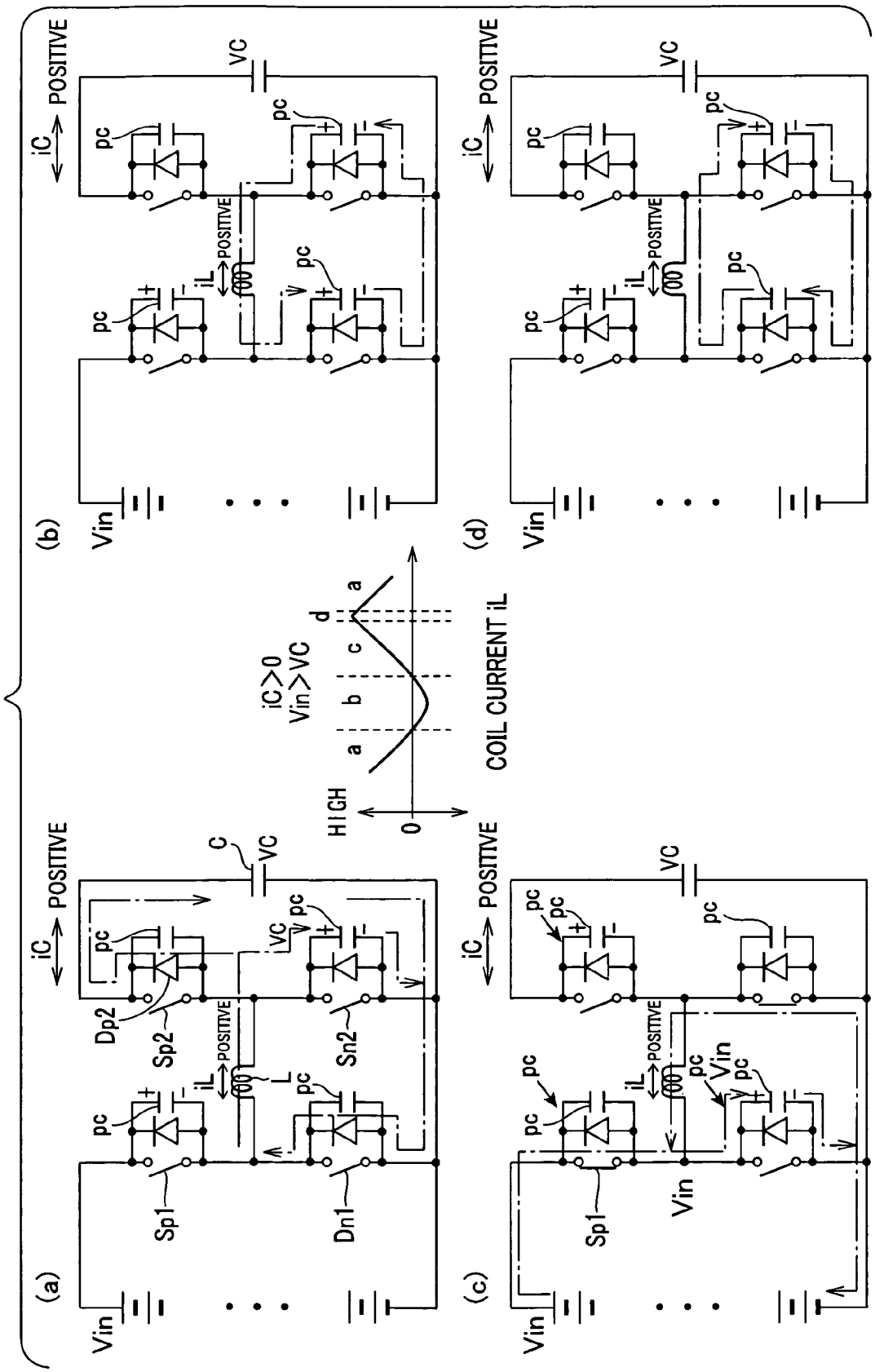
FIG. 6 is a view illustrating a problem of switching control.

FIG. 6 shows a mode of circulation of charges in the case where the output current "iC" is positive and the voltage "VC" (output voltage) of the capacitor C is smaller than the voltage (input voltage "Vin") of the high-voltage battery 12. It should be noted that parasitic capacitors pc are indicated in FIG. 6. For the convenience of the following explanation, the electrostatic capacities of the parasitic capacitors pc are all assumed to be the same.

As shown in FIG. 6 by (a), when the switching elements Sp1, Sp2, Sn1, Sn2 are all in an OFF state, current passes through a closed loop circuit including the coil L, the diode Dp2, the capacitor C and the diode Dn1. In this case, the parasitic capacitor pc of the switching element Sn2 is charged up to a level of the voltage "VC" of the capacitor C (more precisely, the parasitic capacitor pc is charged up to a value which is equivalent to a sum of the voltage "VC" of the capacitor C and the amount of voltage drop of the diode Dp2). Also, the capacitor pc of the switching element Spy is charged up to a level of the input voltage "Vin" (more precisely, the parasitic capacitor pc is charged up to a value which is equivalent to a sum of the input voltage "Vin" and the amount of voltage drop of the diode Dn1). Therefore, by the time point when the coil current "iL" has been zeroed, the parasitic capacitors of the output voltage control switching elements Sp1, Sn2 have been charged, and thus zero-volt switching cannot be conducted.

In this regard, as shown in FIG. 6 by (b), a predetermined standby time is given after the coil current "iL" has been zeroed, but preceding the switching of the switching elements Sp1, Sn2 to an ON state. As a result, the parasitic capacitors pc of the switching elements Sp1, Sn2 may be discharged. However, in the case where the voltage "VC" of the capacitor C is smaller than the input voltage "Vin", no complete discharge can be performed as to the parasitic capacitor of the switching element Sp1. This is because the charged voltage of the parasitic capacitor of the switching element Sn1 increases only up to the level of "VC", due to the discharge of the parasitic capacitor of the switching element Sn2. For this reason, zero-volt switching cannot be performed for the switching element Sp1.

Figure 7:
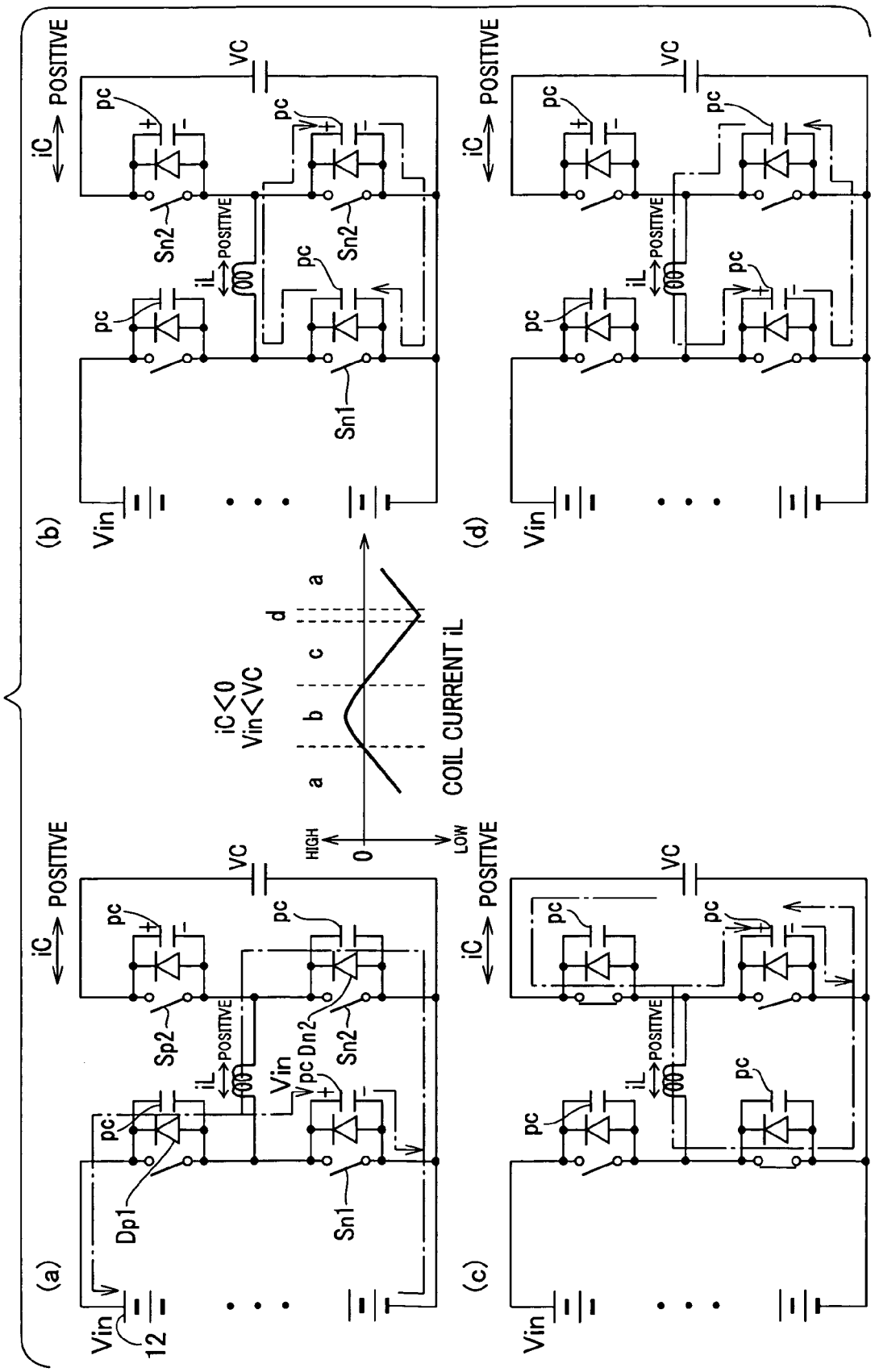
FIG. 7 is a view illustrating a problem of switching control.

FIG. 7 shows a mode of circulation of charges in the case where the output current "iC" is negative and the voltage "VC" of the capacitor C is larger than the input voltage "Vin".

As shown in FIG. 7 by (a), when the switching elements Sp1, Sp2, Sn1, Sn2 are all in an OFF state, current passes through a closed loop circuit including the coil L, the diode Dp1, the high-voltage battery 12 and the diode Dn2. In this case, the parasitic capacitor pc of the switching element Sn1 is charged up to a level of the input voltage "Vin" (more precisely, the parasitic capacitor pc is charged up to a value which is equivalent to a sum of the input voltage "Vin" and the amount of voltage drop of the diode Dp1). Also, the capacitor pc of the switching element Sp2 is charged up to a level of the voltage "VC" of the capacitor C (more precisely, the parasitic capacitor pc is charged up to a value which is equivalent to a sum of the voltage of the capacitor C and the amount of voltage drop of the diode Dn2). Therefore, by the time point when the coil current "iL" has been zeroed, the parasitic capacitors of the output voltage control switching elements Sp2, Sn1 have been charged, and thus zero-volt switching cannot be performed.

In this regard, as shown in FIG. 7 by (b), a predetermined standby time is given after the coil current "iL" has been zeroed, but preceding the switching of the switching elements Sp2, Sn1 to an ON state. As a result, the parasitic capacitors pc of the switching elements Sp2, Sn1 may be discharged. However, in the case where the voltage "VC" of the capacitor C is larger than the input voltage "Vin", no complete discharge can be performed as to the parasitic capacitor of the switching element Sp2. This is because the charged voltage of the parasitic capacitor of the switching element Sn2 increases only up to a level of "Vin", due to the discharge of the parasitic capacitor of the switching element Sn1. For this reason, zero-volt switching cannot be performed for the switching element Sp2.

Figure 8:
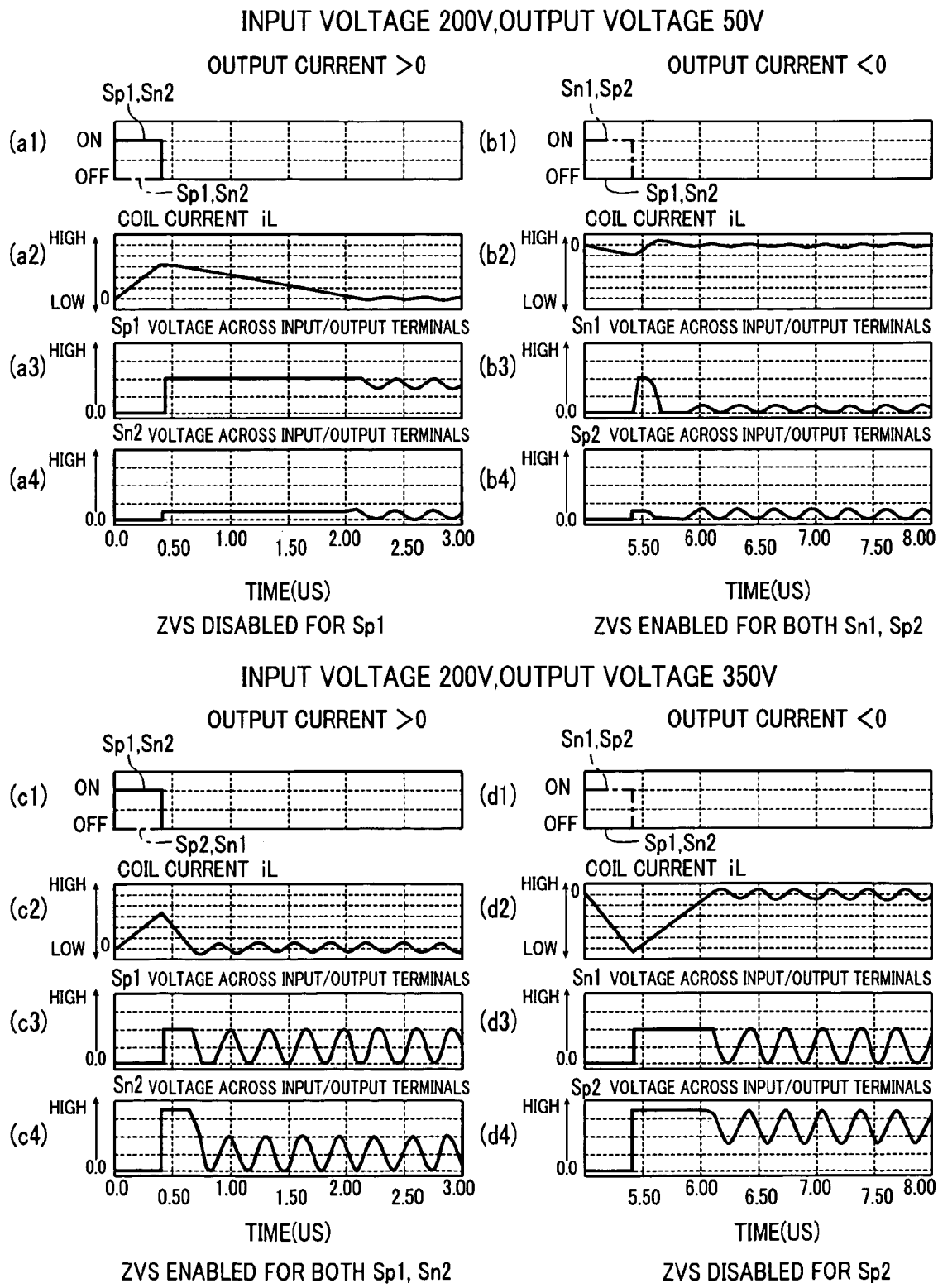
FIG. 8 is a time diagram illustrating a problem of switching control.

FIG. 8 shows voltage transition between the input/output terminals of the switching elements shown in the examples of FIGS. 6 and 7. FIG. 8 shows by (a1) to (a4) the examples in which the output current "iC" is positive, in the case where the input voltage "Vin" is "200 V" and the voltage VC (output voltage) of the capacitor C is "50 V". Specifically, FIG. 8 shows by (a1) the operating conditions of the switching elements Sp1, Sp2, Sn1, Sn2, by (a2) the transition of the coil current "iL", by (a3) the transition of the voltage across the input/output terminals of the switching element Sp1, and by (a4) the transition of the voltage across the input/output terminals of the switching element Sn2. As shown, in this case, even when a standby time is given preceding switching ON of the switching element Sp1, the voltage across the input/output terminals of the switching element Sp1 will not be zeroed, disabling zero-volt switching.

On the other hand, FIG. 8 shows by (b1) to (b4) the examples in which the output current "iC" is negative, in the case where the input voltage "Vin" is "200 V" and the voltage "VC" (output voltage) of the capacitor C is "50 V". Specifically, FIG. 8 shows by (b1) the operating conditions of the switching elements Sp1, Sp2, Sn1, Sn2, by (b) the transition of the coil current "iL", by (b3) the transition of the voltage across the input/output terminals of the switching element Sn1, and by (b4) the transition of the voltage across the input/output terminals of the switching element Sp2. As shown, in this case, when a standby time is given preceding switching ON of the switching elements Sn1, Sp2, the voltage across the input/output terminals of the switching elements can be zeroed, enabling zero-volt switching in both of the switching elements.

Also, FIG. 8 shows by (c1) to (c4) the examples in which the output current "iC" is positive, in the case where the input voltage "Vin" is "200 V" and the voltage "VC" (output voltage) of the capacitor C is "350 V". It should be appreciated that (c1) to (c4) of FIG. 8 correspond to (a1) to (a4) of FIG. 8, respectively. As shown, in this case, when a standby time is given preceding switching ON of the switching elements Sp1, Sn2, the voltage across the input/output terminals of the switching elements can be zeroed, enabling zero-volt switching for both of the switching elements.

Further, FIG. 8 shows by (d1) to (d4) the examples in which the output current "iC" is negative, in the case where the input voltage "Vin" is "200 V" and the voltage "VC" (output voltage) of the capacitor C is "350 V". It should be appreciated that (d1) to (d4) of FIG. 8 correspond to (b1) to (b4) of FIG. 8, respectively. As shown, in this case, even when a standby time is given preceding switching ON of the switching elements Sn1, Sp2, the voltage across the input/output terminals of the switching element Sp2 will not be zeroed, disabling zero-volt switching.

As explained above, depending on the input voltage "Vin" and the voltage "VC" of the capacitor, zero-volt switching cannot be performed. In view of this, in the present embodiment, a certain process is performed before the output voltage control switching elements are turned ON. Specifically, in this process, energy is loaded on the coil L via the switching elements which are not used for the control of the output voltage. As a result of this process, the charges of the parasitic capacitors of the output voltage control switching elements can be discharged until the charges are zeroed. The details on this are described below.

Figure 9:
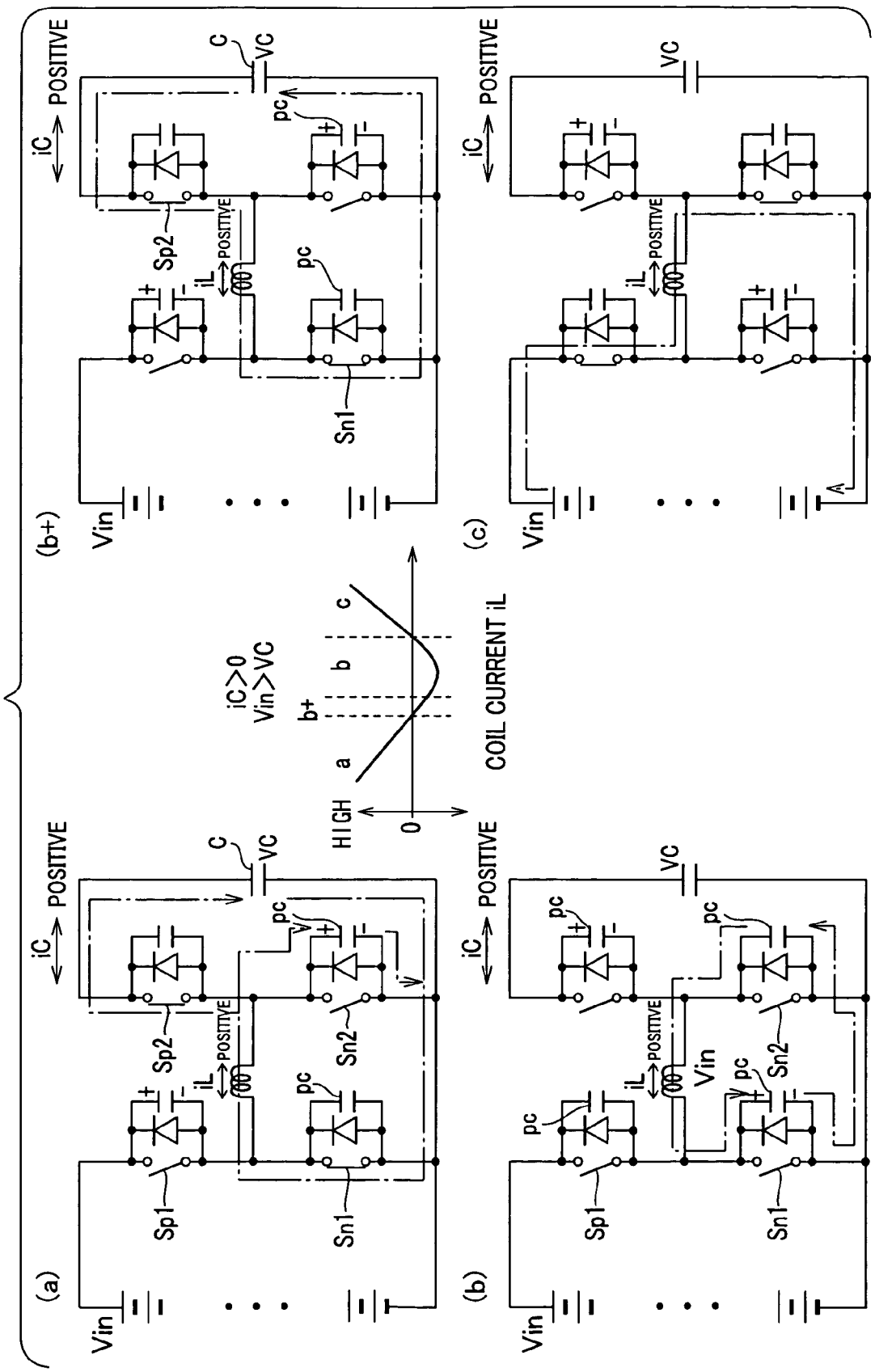
FIG. 9 is a view illustrating a mode of soft-switching processing, according to the first embodiment.

FIG. 9 shows a case where the output current "iC" is positive and the input voltage "Vin" is larger than the voltage "VC" of the capacitor C. As shown in FIG. 9 by (a), even in a period when the current passing through the coil L is gradually decreased by the OFF state of the output voltage control switching elements Sp1, Sp2, the present embodiment permits the remaining switching elements Sp2, Sn1 to be turned ON in advance. As shown in FIG. 9 by (b+), the switching elements Sp2, Sn1 are permitted to be turned ON for a predetermined period even after the coil current "iL" has been zeroed. Thus, energy is loaded on the coil L by the flow of current through the closed loop circuit including the capacitor C, the switching element Sp2, the coil L and the switching element Sn1. After that, as shown in FIG. 9 by (b), all of the switching elements Sp1, Sp2, Sn1, Sn2 are turned OFF. Thus, the parasitic capacitor pc of the switching element Sn1 can be charged up to the input voltage "Vin", exceeding the voltage "VC" of the capacitor C. As a result, the parasitic capacitor pc of the switching element Sp1 can be completely discharged.

Figure 10:
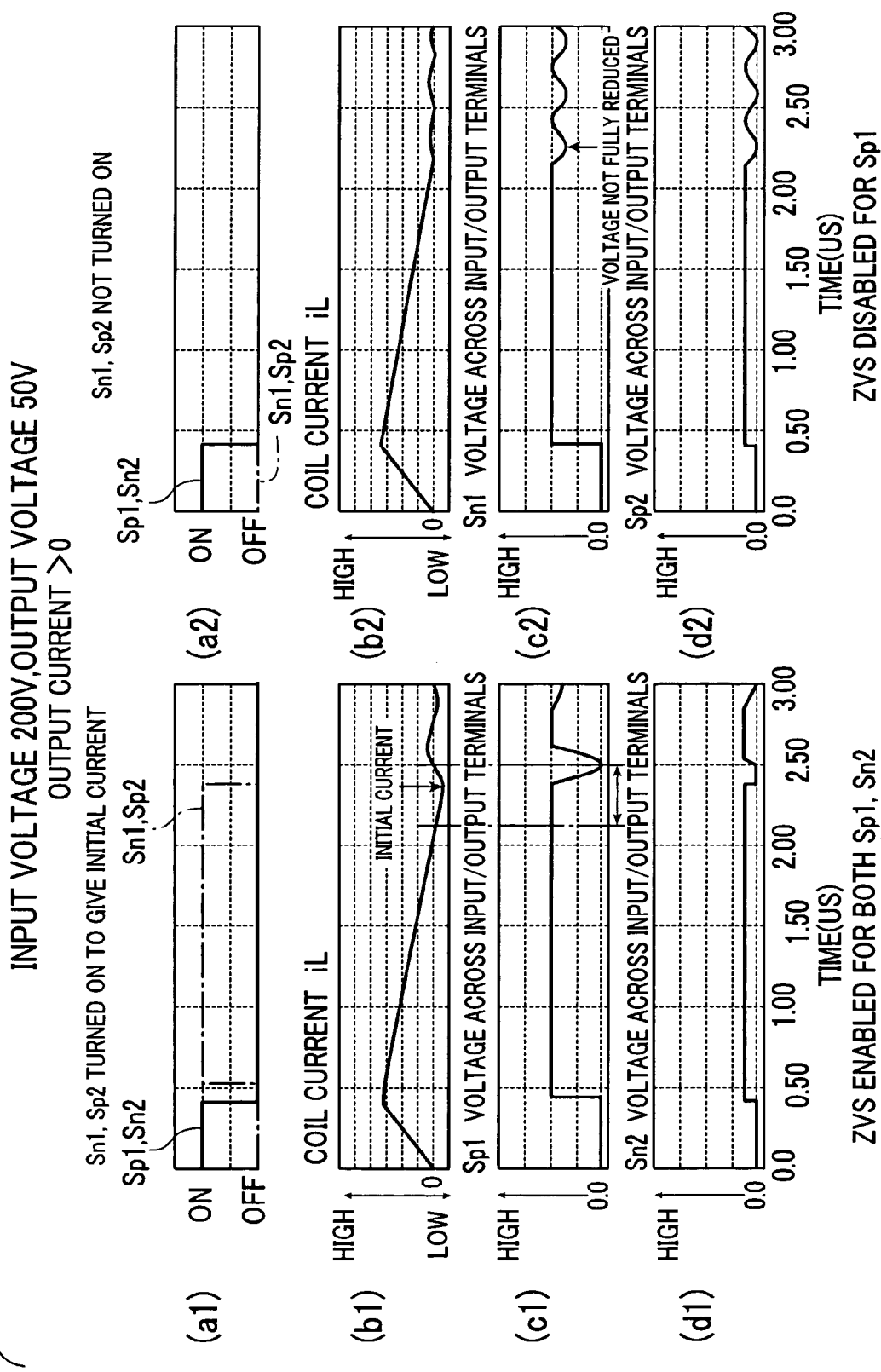
FIG. 10 is a time diagram illustrating the mode of soft-switching processing.

FIG. 10 shows, by (a1), (b1), (c1), (d1) the behaviors of the voltage across the input/output terminals of the switching elements Sp1, Sn2. It should be appreciated that (a1), (b1), (c1), (d1) of FIG. 10 correspond to (a1) to (a4) of FIG. 8, respectively. As shown, the present embodiment enables sufficient extraction of charges also from the parasitic capacitor of the switching element Sp1, by loading energy on the coil L. Therefore, zero-volt switching can be performed for both of the switching elements Sp1, Sn2. FIG. 10 shows, by (a2), (b2), (c2), (d2), a conventional example in which no energy loading process is performed for the coil L via the switching elements Sn1, Sp2.

Figure 11:
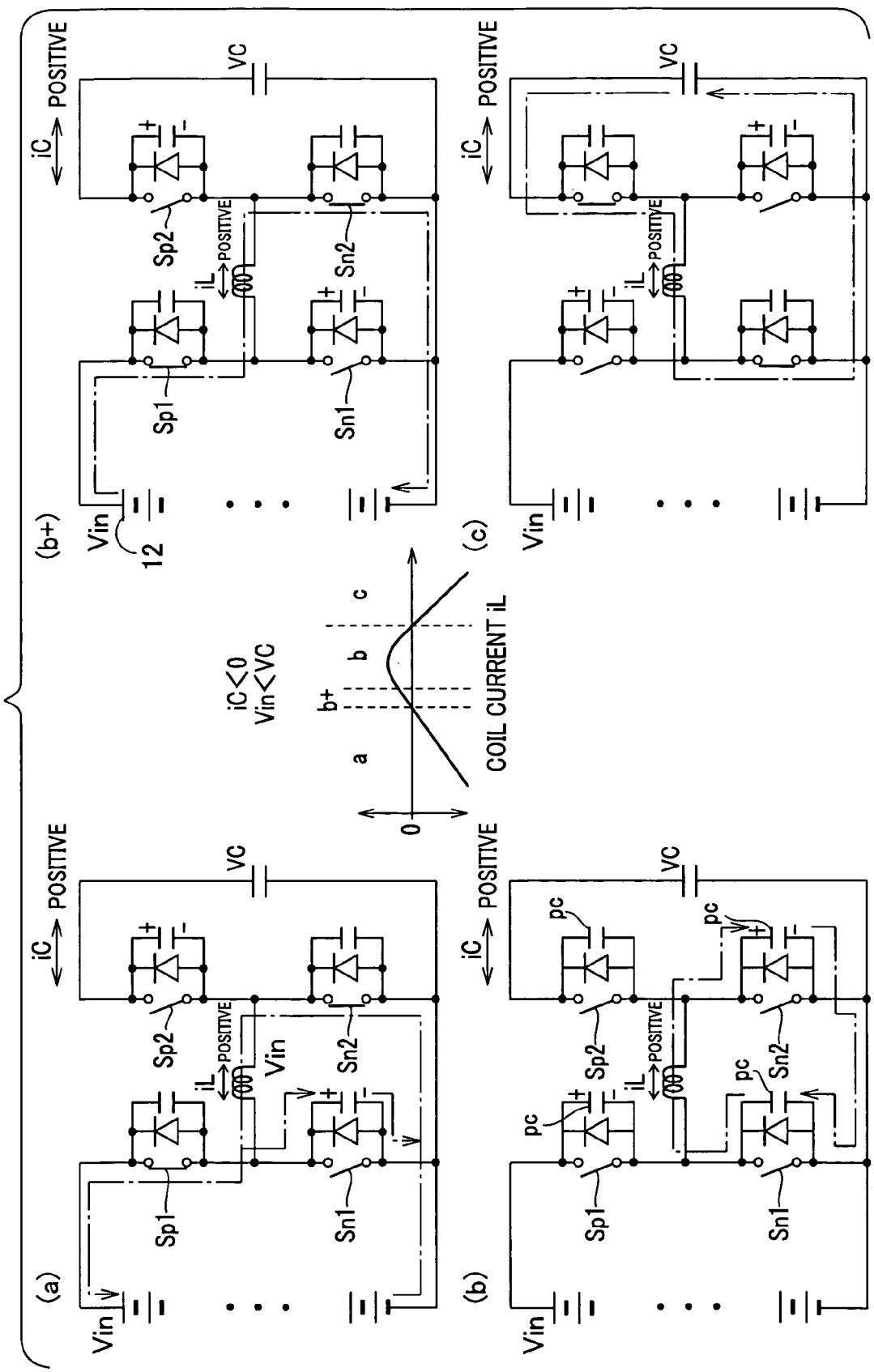
FIG. 11 is a view illustrating a mode of soft-switching processing, according to the first embodiment.

FIG. 11 shows a case where the output current "iC" is negative and the input voltage "Vin" is smaller than the voltage "VC" of the capacitor C. As shown in FIG. 11 by (a), even in a period when the absolute value of the current passing through the coil L is gradually decreased by the OFF state of the output voltage control switching elements Sp2, Sn1, the present embodiment permits the remaining switching elements Sp1, Sn2 to be turned ON in advance. As shown in FIG. 11 by (b+), the switching elements Sp1, Sn2 are permitted to be turned ON for a predetermined period even after the coil current "iL" has been zeroed. Thus, energy is loaded on the coil L by the flow of current through the closed loop circuit including the high-voltage battery 12, the switching element Sp1, the coil L and the switching element Sn2. After that, as shown in FIG. 11 by (b), all of the switching elements Sp1, Sp2, Sn1, Sn2 are turned OFF. Thus, the parasitic capacitor pc of the switching element Sn2 can be charged up to the voltage "VC" of the capacitor C, exceeding the input voltage "Vin". As a result, the parasitic capacitor pc of the switching element Sp2 can be completely discharged.

Figure 12:
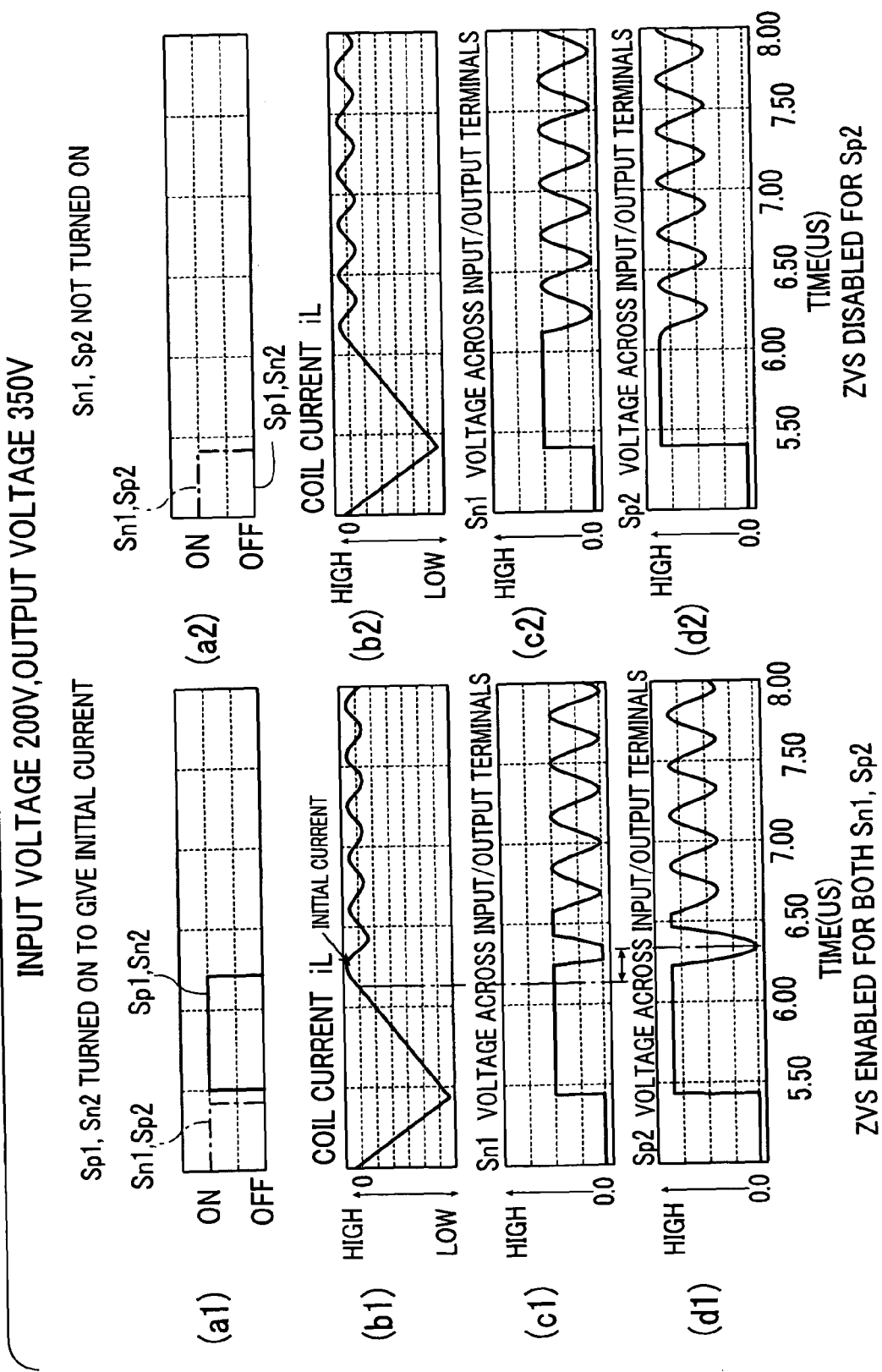
FIG. 12 is a time diagram illustrating the mode of soft-switching processing.

FIG. 12 shows, by (a1), (b1), (c1), (d1), the behaviors of the voltage across the input/output terminals of the switching elements Sp2, Sn1. It should be appreciated that (a1), (b1), (c1), (d1) of FIG. 12 correspond to (b1) to (b4) of FIG. 8, respectively. As shown, the present embodiment enables sufficient extraction of charges also from the parasitic capacitor of the switching element Sp2, by loading energy on the coil L. Therefore, zero-volt switching can be performed for both of the switching elements Sp2, Sn1. FIG. 12 shows, by (a2), (b2), (c2), (d2), a conventional example in which no energy loading process is performed for the coil L via the switching elements Sn2, Sp1.

Figure 13:
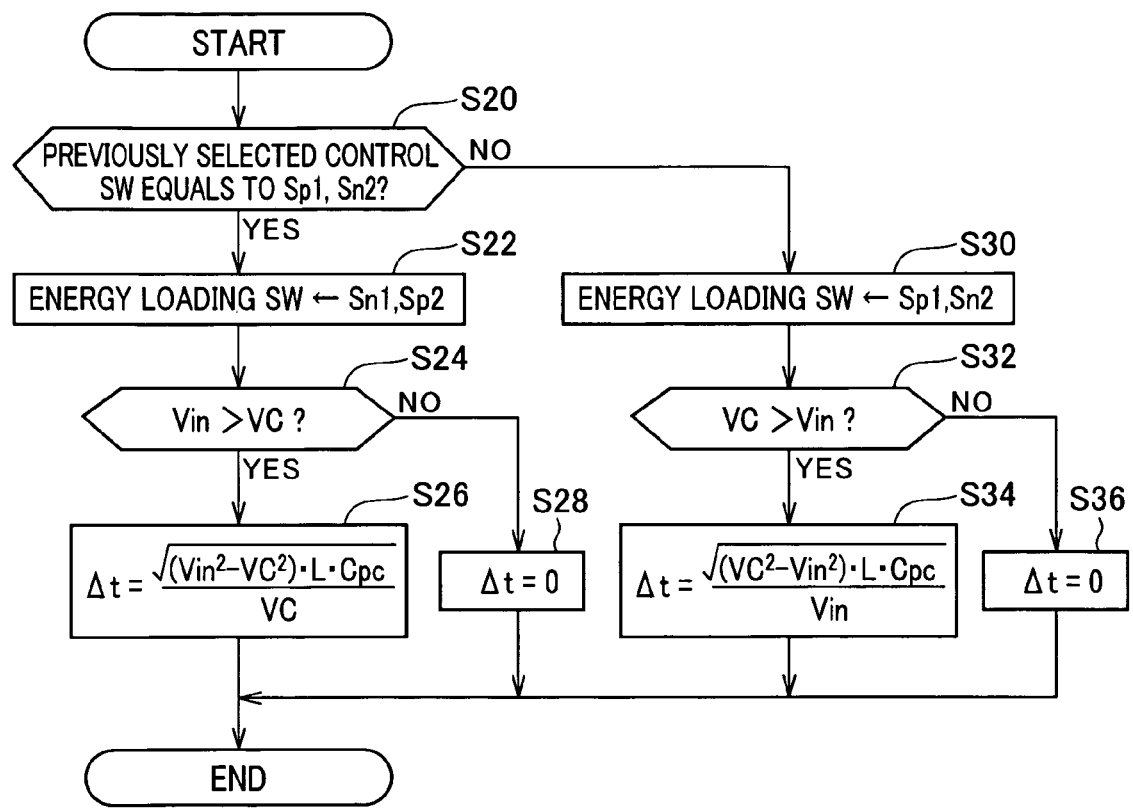
FIG. 13 is a flow diagram illustrating a procedure of a process for setting time for energy loading processing, according to the first embodiment.

FIG. 13 shows a procedure of a switching time setting process for loading energy on the coil. This process is repeatedly performed in a predetermined cycle, for example, by the operation signal setting units 72, 84, 96 shown in FIG. 3.

In a series of steps, at step S20, it is determined first whether or not the previously selected output voltage control switching elements have been the switching elements Sp1, Sn2. If an affirmative determination is made at step S20, the switching elements Sn1, Sp2 are selected, at step S22, as energy loading switching elements. At the subsequent step S24, it is determined whether or not the input voltage "Vin" is larger than the voltage "VC" of the capacitor C. This step is for determining whether or not zero-volt switching can be performed by only giving a standby after the current "iL" of the coil L has been zeroed time but preceding the ON operation of the switching elements Sp1, Sn2.

If an affirmative determination is made at step S24, it is determined that zero-volt switching cannot be performed by only giving a standby time after the current "iL" of the coil L has been zeroed but preceding the ON operation of the switching elements Sp1, Sn2, and control proceeds to step S26. At step S26, a retention time "Δt" is calculated based on the following formula (c1), for retaining the switching elements Sn1, Sp2 in an ON state after the current "iL" of the coil L has been zeroed.

$$\Delta t = (1/VC)\sqrt{\{Vin \cdot Vin - VC \cdot VC) \cdot L \cdot Cpc\}} \quad (c1)$$

Here, a composite electrostatic capacity "Cpc" of the parasitic capacitor pc and inductance "L" of the coil L are used. It should be appreciated that the term "composite electrostatic capacity 'Cpc'" refers to a sum of the electrostatic capacity of the pair of serially connected switching elements Sp1, Sn1, and the electrostatic capacity of the serially connected switching elements Sp2, Sn2. It has been derived as follows. First, in the process shown in FIG. 6, the energy that will have been loaded on the parasitic capacitors of the switching elements Sp2, Sn2 is "VC·VC·Cpc/2" by the time point when the current "iL" of the coil L is zeroed. Also, the energy that will have been stored in the coil L after expiration of the retention time "Δt" is "L·VC·VC·Δt·Δt/2". Here, in order to load energy of "Vin·Vin·Cpc/2" on the parasitic capacitors of the switching elements Sp1, Sn1, the following formula (c2) based on the energy conservation law is required to be established.

$$Vin \cdot Vin \cdot Cpc/2 = L \cdot VC \cdot VC \cdot \Delta t \cdot \Delta t/2 + VC \cdot VC \cdot Cpc/2 \quad (c2)$$

Solving the formula (c2) in terms of the retention time "Δt", the above formula (c1) can be obtained.

On the other hand, if a negative determination is made at step 524, it is determined that zero-volt switching can be performed by only giving a standby time after the current "iL" of the coil L has been zeroed but preceding the ON operation of the switching elements Sp1, Sn2, and control proceeds to step 528. At step 528, the retention time "Δt" is zeroed.

Meanwhile, if a negative determination is made at step 520, control proceeds to step S30, where the energy loading switching elements are determined to be the switching elements Sp1, Sn2 because the switching elements Sn1, Sp2 have previously been selected as the output voltage control switching elements. At the subsequent step S32, a determination is made as to whether or not the voltage "VC" of the capacitor C is larger than the input voltage "Vin". This step is for determining whether or not zero-volt switching can be performed by only giving a predetermined standby time preceding the ON operation of the switching elements Sn1, Sp2. If an affirmative determination is made at step 532, it is determined that zero-volt switching cannot be performed by only giving a standby time after the current "iL" of the coil L has been zeroed but preceding the ON operation of the switching elements Sn1, Sp2, and control proceeds to step 534. At step S34, a retention time "Δt" is calculated by the following formula (c3), for retaining the ON state of the switching elements Sp1, Sn2 after the current "iL" of the coil L has been zeroed.

$$\Delta t = (1/Vin)\sqrt{\{VC \cdot VC - Vin \cdot Vin) \cdot Cpc\}} \quad (c3)$$

On the other hand, if a negative determination is made at step S32, it is determined that zero-volt switching can be performed by only giving standby time after the current "iL" of the coil L has been zeroed but preceding the ON operation of the switching elements Sn1, Sp2, and control proceeds to step S36. At step S36, the retention time "Δt" is zeroed.

When the steps 526, S28, S34 and 536 are completed, the series of steps is temporarily ended.

Figure 14:
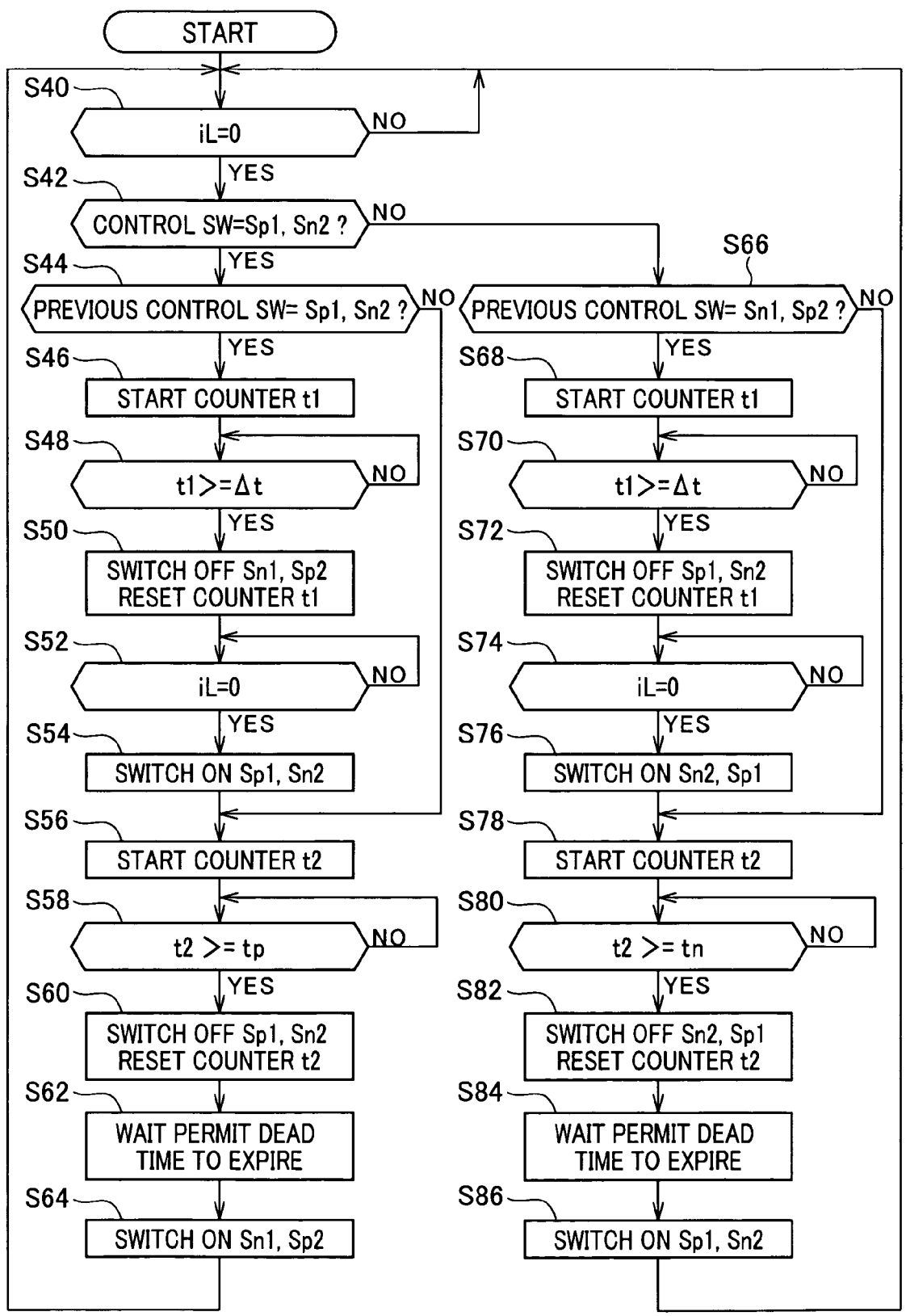
FIG. 14 is a flow diagram illustrating a procedure of a process for switching control, according to the first embodiment.

FIG. 14 shows a procedure of a switching control process according to the present embodiment. This process is repeatedly performed in a predetermined cycle, for example, by the operation signal setting units 72, 84 and 96 shown in FIG. 3.

In a series of steps, at step S40, it is determined first whether or not the current "iL" passing through the coil L has been zeroed. This step is for determining a start point for performing energy loading process using the energy loading switching elements. If an affirmative determination is made at step S40, it is determined, at step 542, whether or not the control switching elements to be turned ON this time are the switching elements Sp1, Sn2. If an affirmative determination is made at step S42, it is determined, at step S44, whether or not the control switching elements previously turned ON have also been the switching elements Sp1, Sn2. This step is for determining whether the polarity of the output command value "iCc" has not been changed.

If an affirmative determination is made at step S44, it means that the polarity of the output command value "iCc" has not been change from the previous one and thus is positive. Thus, control proceeds to step S46 where a counter t1 starts counting operation to count time since the current "iL" of the coil L has been zeroed. When the value of the counter t1 has reached the retention time "Δt" calculated at step S26 shown in FIG. 13 (YES at step S48), control proceeds to step S50. At step S50, the switching elements Sn1, Sp2 are turned OFF to reset the counter t1.

When the current "iL" passing through the coil L has been zeroed (step S52), the switching elements Sp1, Sn2 are turned ON at step S54. In this case, if the coil current "iL" has been zeroed, the parasitic capacitors pc of the switching elements Sp1, Sn2 are considered to have been completely discharged. This means that zero-volt switching is now performed. At the subsequent step S56, a counter t2 starts counting operation to count ON time of the switching elements Sp1, Sn2. Then, after expiration of the ON time "tp" (YES at step S58), the switching elements Sp1, Sn2 are turned OFF, at step S60, concurrently resetting the counter t2.

At the subsequent step S62, a standby time is given, which corresponds to a dead time for reliably preventing the switching elements Sp1, Sn2 and the switching elements Sn1, Sp2 from being simultaneously switched ON. At the subsequent step S64, the switching elements Sn1, Sp2 are turned ON. Thus, a preparation is completed, for utilizing the switching elements Sn1, Sp2 as the energy loading switching elements. As shown in FIG. 9, current can now be passed through the switching elements Sn1, Sp2 also before the current "iL" of the coil L is zeroed. In this case, loss (conduction loss) can be reduced when the semiconductor elements are in the state of being supplied with current.

On the other hand, if a negative determination is made at step S42, the process at steps S66 to S86 is performed in the manner of the process at steps S44 to S64.

If a negative determination is made at step S44, control proceeds to step S56. This case corresponds to the case where the switching elements Sn1, Sp2 as control switching elements are switched to the switching elements Sp1, Sn2. Therefore, the switching elements Sp1, Sn2 are in the state of having been already turned ON at step S86. Accordingly, in this case, control proceeds to step S56 to count the ON time "tp". The same is considered to be applied to the case where a negative determination is made at step S66.

As have been described in detail, the following advantages can be obtained according to the present embodiment.

(1) Energy has been loaded on the coil L via the energy loading switching elements, after the current passing through the coil L has been zeroed by the OFF operation of the output voltage control switching elements corresponding to the existing polarity of the output current "iC", but preceding the ON operation of the same switching elements. Thus, the voltage across the input/output terminals of the output voltage control switching elements can be appropriately reduced.

(2) The output voltage control switching elements have been set based on the polarity of the output command value "iCc". Thus, the switching elements can be appropriately operated.

(3) The retention time "Δt" has been set for retaining the ON state of the energy loading switching elements, starting from the time point when the current passing through the coil L has been zeroed. Thus, the time necessary for appropriately loading energy on the coil L can be appropriately set.

(4) The retention time "Δt" has been calculated based on the voltage "VC" of the capacitor C and the input voltage "Vin". Thus, switching control can be performed so that the coil L can be loaded with an amount of energy required for zeroing the voltage across the input/output terminals of the voltage control switching elements.

(5) The output voltage control switching elements have been turned ON after the switching elements Sp1, Sp2, Sn1, Sn2 have all been turned OFF, but at the time point when the current passing through the coil L is zeroed. Thus, the switching elements can be prevented from being passed with overcurrent between the input/output terminals thereof, in performing switching from an OFF state to an ON state. In addition, power loss that would otherwise have accompanied the switching can be mitigated.

(6) The energy loading switching elements have been turned ON after expiration of the dead time that follows the time point when the output voltage control switching elements are turned OFF. Thus, the energy loading accuracy can be prevented from being fluctuated depending the accuracy of the switching to an ON state.

(7) Control has been performed in such a way that the voltage "VC" of the capacitor C may be varied ranging from a voltage larger than the input voltage "Vin" to a voltage smaller than the input voltage "Vin", and that the polarity of the output current "iC" may be either positive or negative. Thus, merely adjusting the electronic parts, such as making the electrostatic capacity of the parasitic capacitor asymmetric, may not enable zero-volt switching in any of the cases. Therefore, the present invention has particularly high value of applications.

Second Embodiment

Figure 15:
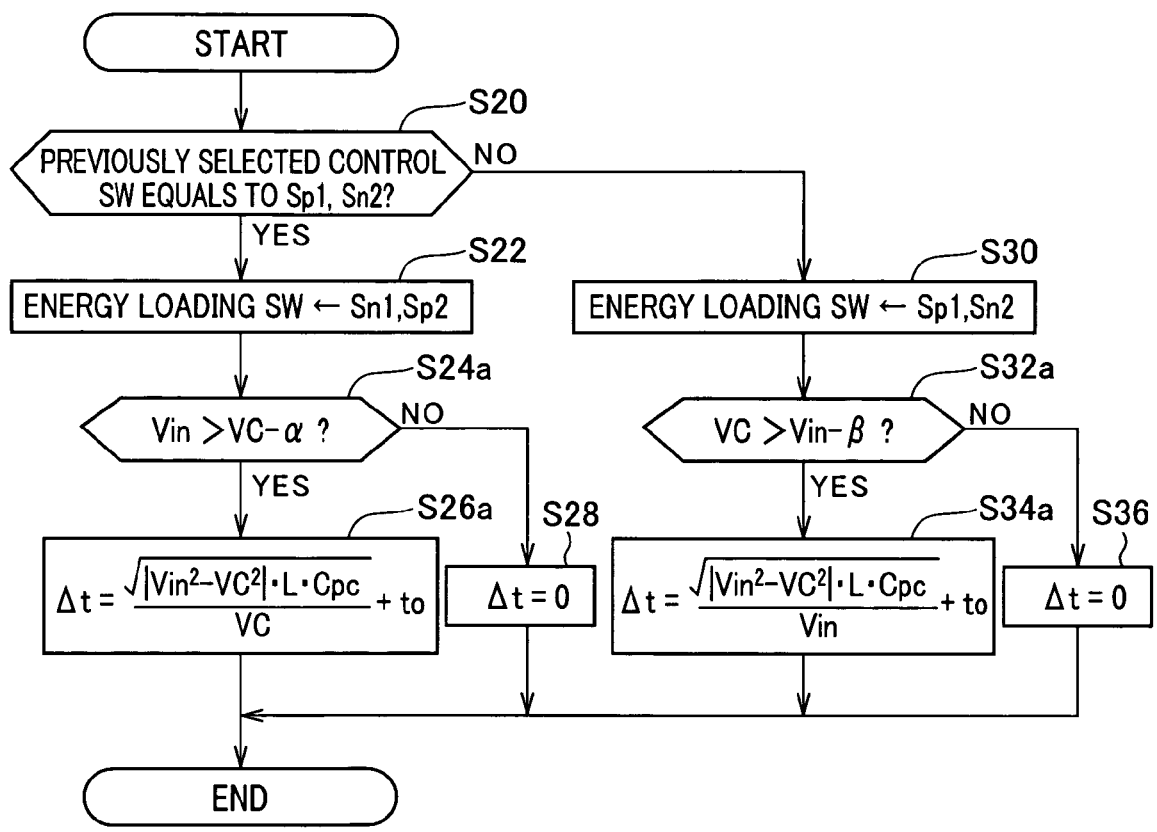
FIG. 15 is a flow diagram illustrating a procedure of a process for setting time for energy loading processing, according to a second embodiment of the present invention.

Referring now to FIG. 15, hereinafter is described a second embodiment of the present invention. It should be appreciated that, in the present embodiment and the subsequent embodiments, the components identical with those in the first embodiment are allocated with the same reference symbols to omit or simplify the explanation.

The second embodiment is described below, referring to the figure and focusing on the differences from the first embodiment.

FIG. 15 shows a procedure of a process for setting the retention time "Δt", according to the present embodiment. This process is repeatedly performed in a predetermined cycle, for example, by the operation signal setting units 72, 84, 96 shown in FIG. 3. It should be appreciated that, in FIG. 15, the steps corresponding to those shown in FIG. 13 are allocated with the same step numbers, for the sake of convenience.

In the present embodiment, when the switching elements Sn1, Sp2 are the energy loading switching elements, it is determined, at step S24a, whether or not the input voltage "Vin" is larger than a value obtained by subtracting a predetermined value "α" (>0) from the voltage "VC" of the capacitor C. The predetermined value "α" is used for reliably zeroing the voltage across the input/output terminals of the output voltage control switching elements by making the retention time "Δt" positive, even in the case where the retention time "Δt" can theoretically be zero but an error may accompany the theory. If an affirmative determination is made at step S24a, the retention time "Δt" is set longer, by an offset time "t0", relative to the retention time "Δt" (the above formula (c1)) obtained through the theoretical calculation (step S26a).

Similarly, when the switching elements Sp1, Sn2 are the energy loading switching elements, it is determined, at step S32a, whether or not the voltage "VC" of the capacitor C is larger than a value obtained by subtracting a predetermined value "β" from the input voltage "Vin". If an affirmative determination is made at step S32a, the retention time "Δt" is set longer, by the offset time "t0", relative to the retention time "Δt" (the above formula (c3)) obtained through the theoretical calculation (step S34a).

Thus, even where there is an error in the theoretical calculation, the voltage across the input/output terminals of the switching elements can be reliably zeroed. The first terms of the right-hand sides expressed at steps S26a and S34a of FIG. 15 use absolute values and thus do not correspond to the above formulas (c1) and (c3), respectively, in a strict sense. This, however, is a simplified setting for avoiding the inside of each square root to become negative.

Third Embodiment

Figure 16:
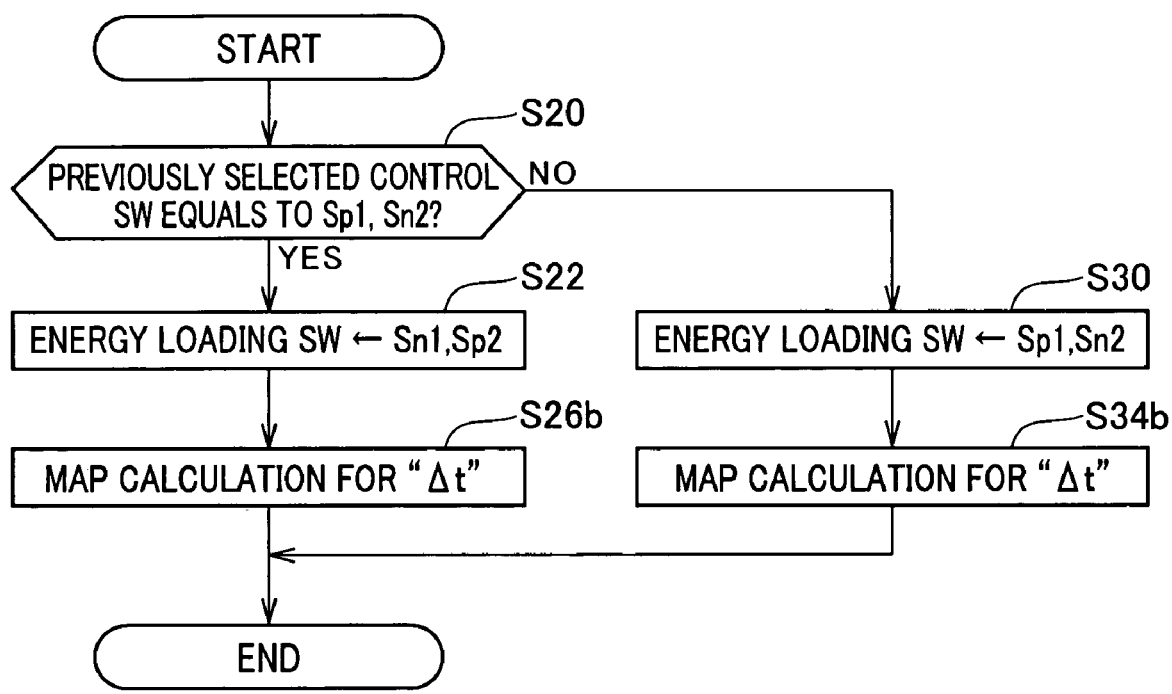
FIG. 16 is a flow diagram illustrating a procedure of a process for setting time for energy loading processing, according to a third embodiment of the present invention.

Referring to FIG. 16, hereinafter is described a third embodiment of the present invention.

The third embodiment is described below, referring to the figure and focusing on the differences from the first embodiment.

FIG. 16 shows a procedure of a process for setting the retention time "Δt", according to the present embodiment. This process is repeatedly performed at a predetermined cycle, for example, by the operation signal setting units 72, 84, 96 shown in FIG. 3. It should be appreciated that, in FIG. 16, the steps corresponding to those shown in FIG. 13 are allocated with the same step numbers, for the sake of convenience.

In the present embodiment, the retention time "Δt" is set using map calculation in the case where the switching elements Sn1, Sp2 are the energy loading switching elements (step S26b). The retention time "Δt" is also set using map calculation in the case where the switching elements Sp1, Sn2 are the energy loading switching elements (step S34b). At step 26b, the retention time "Δt" may desirably be set to "zero" if the input voltage "Vin" is equal to or lower than the voltage "VC" of the capacitor C. Also, at step S34b, the retention time "Δt" may desirably be set to "zero" if the voltage "VC" of the capacitor C is equal to or lower than the input voltage "Vin".

In this way, in the present embodiment, use of a map may facilitate the calculation of the retention time "Δt", considering, as well, the variation of the capacity of the parasitic capacitors cp. In other words, since the electrostatic capacity of the parasitic capacitors cp usually varies, depending on the voltage thereof, the composite electrostatic capacity "Cpc" in the first embodiment has voltage dependency. Therefore, it is required to constantly consider the voltage dependency of the composite electrostatic capacity "Cpc" in order to calculate the retention time "Δt" with high accuracy.

Fourth Embodiment

Figure 17:
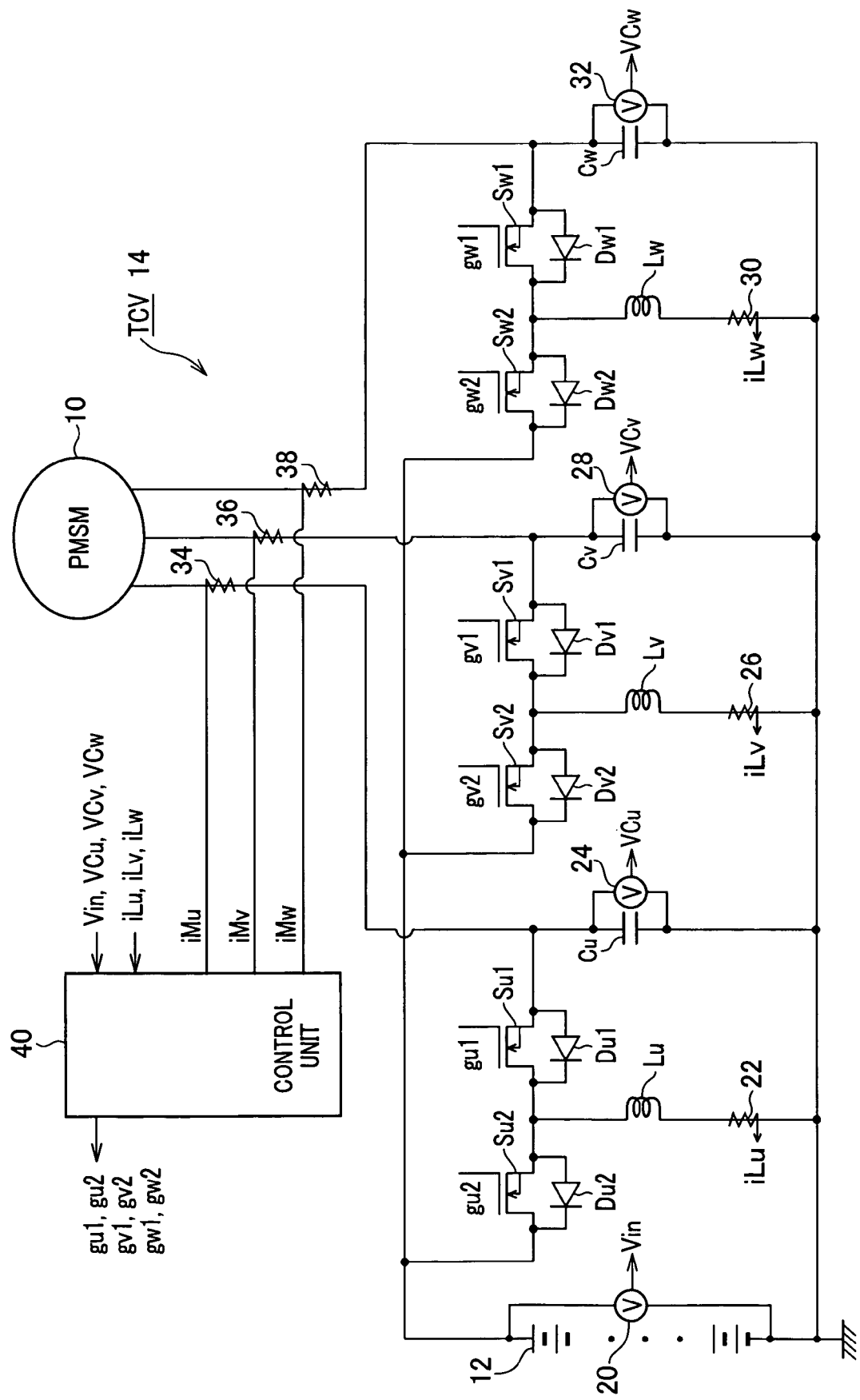
FIG. 17 is a schematic diagram illustrating a system, according to a fourth embodiment of the present invention.
Figure 18:
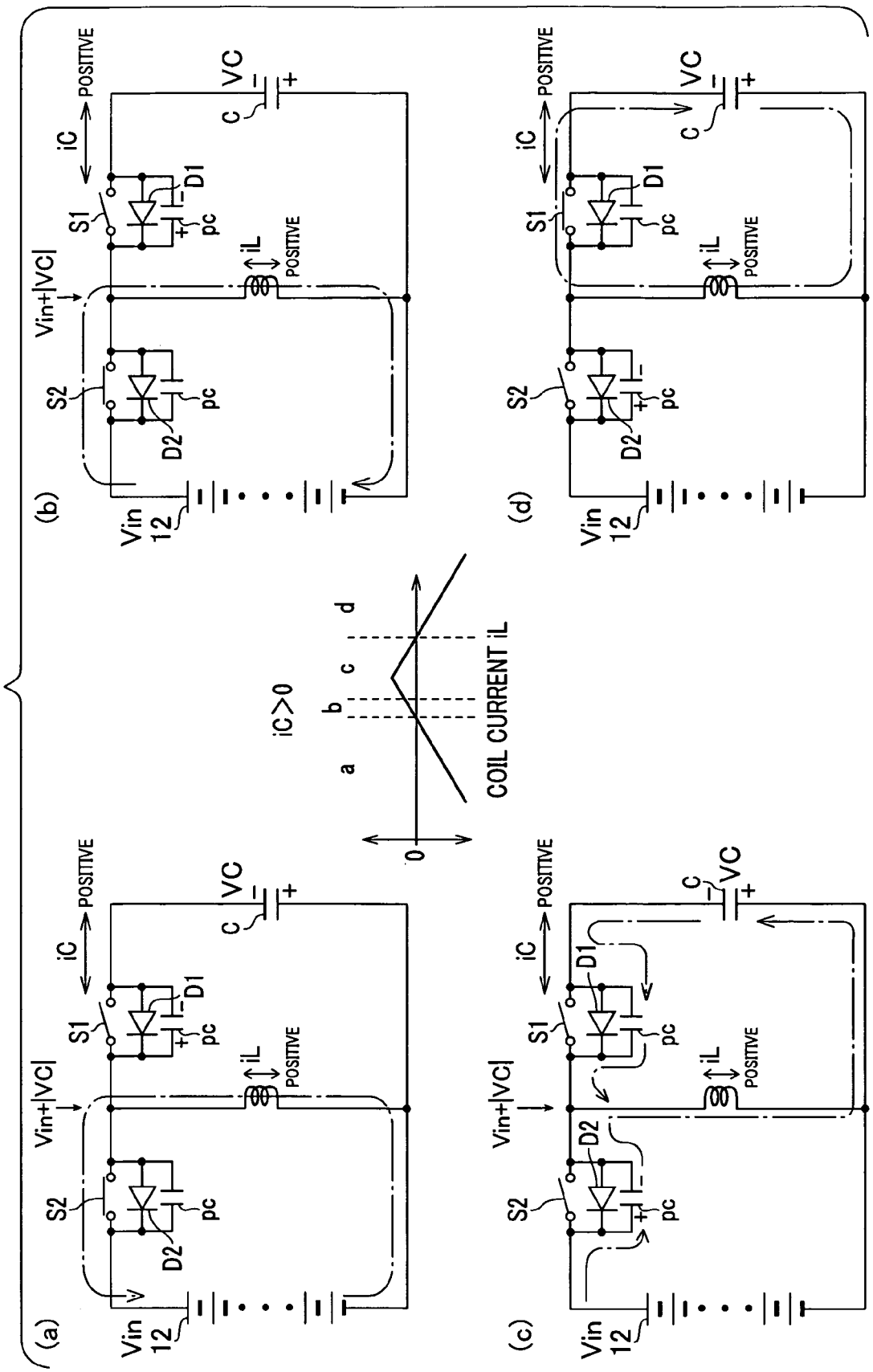
FIG. 18 is a view illustrating a mode of soft-switching processing, according to the fourth embodiment.
Figure 19:
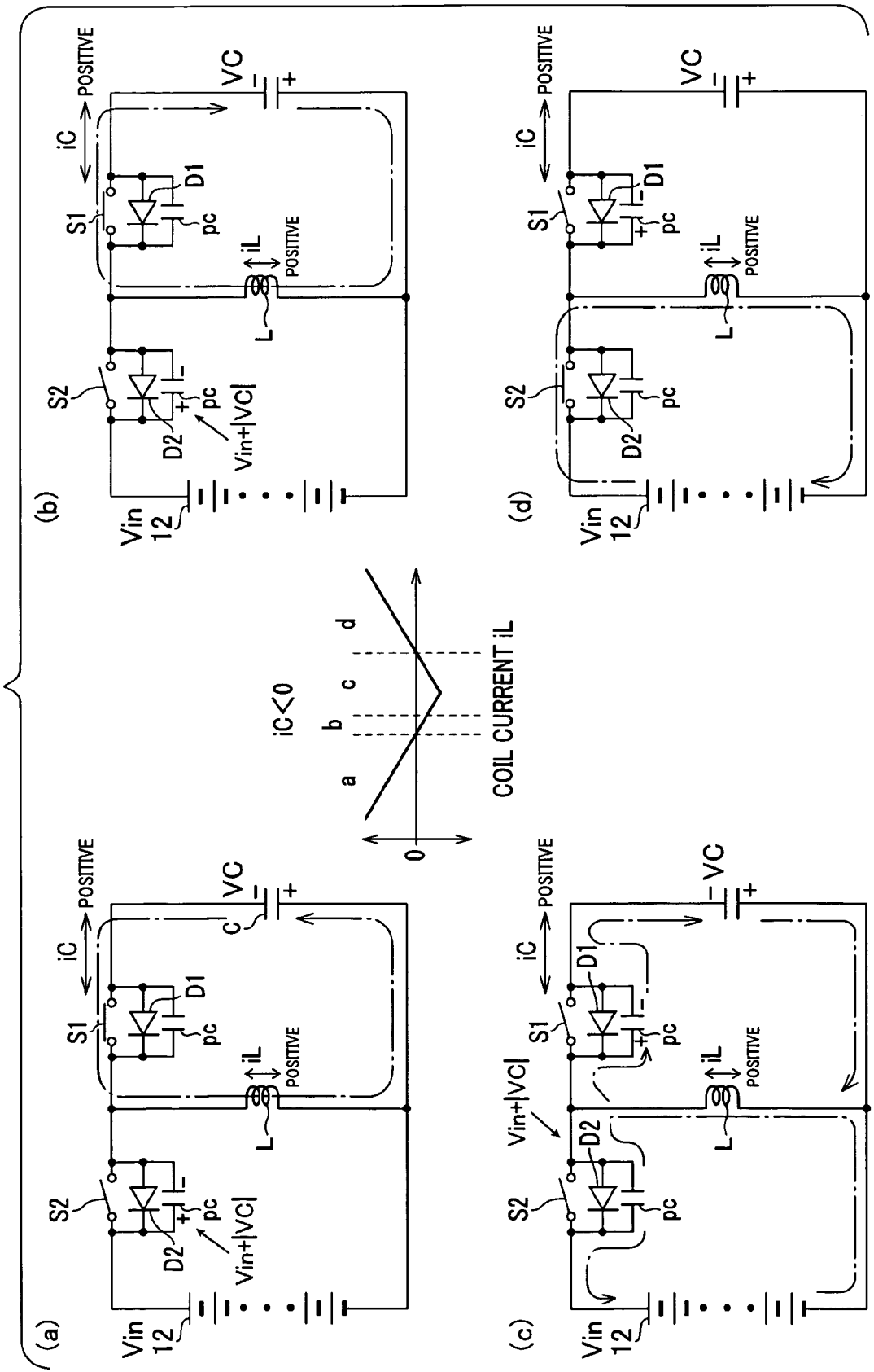
FIG. 19 is a view illustrating a mode of soft-switching processing, according to the fourth embodiment.

Referring to FIGS. 17 to 19, hereinafter is described a fourth embodiment.

The fourth embodiment is described below, referring to the figures and focusing on the differences from the first embodiment.

FIG. 17 is a schematic diagram illustrating a system according to the present embodiment. In FIG. 17, the members corresponding to those shown in FIG. 1 are allocated with the same reference symbols, for the sake of convenience.

As shown, back-boost converters are used as DC-DC converters in the present embodiment to configure the TCV 14. In particular, phase "U" includes the capacitor Cu, serially connected switching elements Su1, Su2 which connect the positive terminal of the high-voltage battery 12 to a node between the capacitor Cu and phase "U" of the motor 10, and the coil Lu that connects a node between the switching elements Su1, Su2 to the ground. In the DC-DC converter, the diodes Du1, Du2 are parallelly connected to the switching elements Su1, Su2, respectively. In the TCV 14, each of phases "V" and "W" is also configured, being provided with a DC-DC converter configured in the similar manner.

FIG. 18 shows a mode of switching control in the case where the output current "iC" is positive. In the present embodiment as well, the output current "iC" is defined, in each DC-DC converter, as the current passed from a circuit other than the capacitor C, to the capacitor C. FIG. 18 uses reference symbols removed with alphabets corresponding to phases from the reference symbols of the individual elements. In particular, for example, the switching elements Su1, Sv1, Sw1 are represented by a switching element S1.

As shown in FIG. 18 by (a), an energy loading switching element S2 is in an ON state even when the output voltage control switching element S1 has been turned OFF to thereby gradually decrease the absolute value of the current passing through the coil L. Then, as shown in FIG. 18 by (b), even after the current passing through the coil L has been zeroed, the energy loading switching element S2 is retained in an ON state up until the expiration of the retention time "Δt" which is calculated in the same manner as exemplified in the first embodiment. Thus, the current "iL" of the coil L flows in the direction which is opposite to the direction of the flow at the time point when the current "iL" is zeroed, and the absolute value is gradually increased. Then, as shown in FIG. 18 by (c), by turning OFF both of the switching elements S1, S2 after the expiration of the retention time, the charges of the parasitic capacitor pc of the output voltage control switching element S1 can be reliably extracted. Therefore, as shown in FIG. 18 by (d), the output voltage control switching element S1 can be subjected to zero-volt switching.

On the other hand, FIG. 19 shows a mode of switching control in the case where the output current "iC" is negative. FIG. 19 also uses reference symbols removed with alphabets corresponding to phases from the reference symbols of the individual elements. In particular, for example, the switching elements Su1, Sv1, Sw1 are represented by the switching element S1.

As shown in FIG. 19 by (a), the energy loading switching element S1 is in an ON state even when the output voltage control switching element S2 has been turned OFF to thereby gradually decrease the absolute value of the current passing through the coil L. Then, as shown in FIG. 19 by (b), even after the current passing through the coil L has been zeroed, the energy loading switching element S1 is retained in an ON state up until the expiration of the retention time "Δt" which is calculated in the same manner as exemplified in the first embodiment. Thus, the current "iL" of the coil L flows in the direction which is opposite to the direction of the flow at the time point when the current "iL" is zeroed, and the absolute value is gradually increased. Then, as shown in FIG. 19 by (c), by turning OFF the switching elements S1, S2 after the expiration of the retention time, the charges of the parasitic capacitor pc of the output voltage control switching element S2 can be reliably extracted. Therefore, as shown in FIG. 19 by (d), the output voltage control switching element S2 can be subjected to zero-volt switching.

Fifth Embodiment

Figure 20:
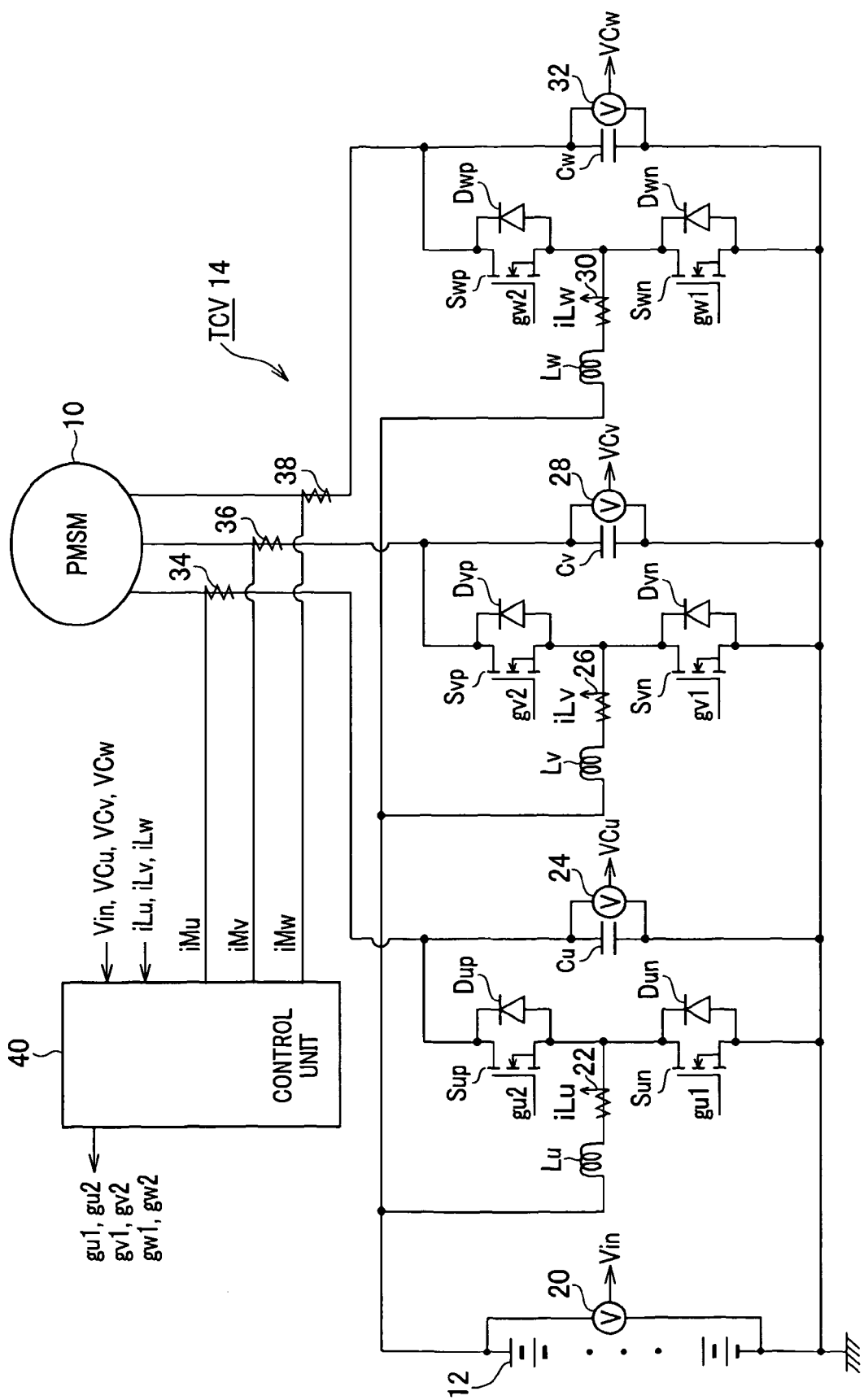
FIG. 20 is a schematic diagram illustrating a system, according to a fifth embodiment of the present invention.
Figure 21:
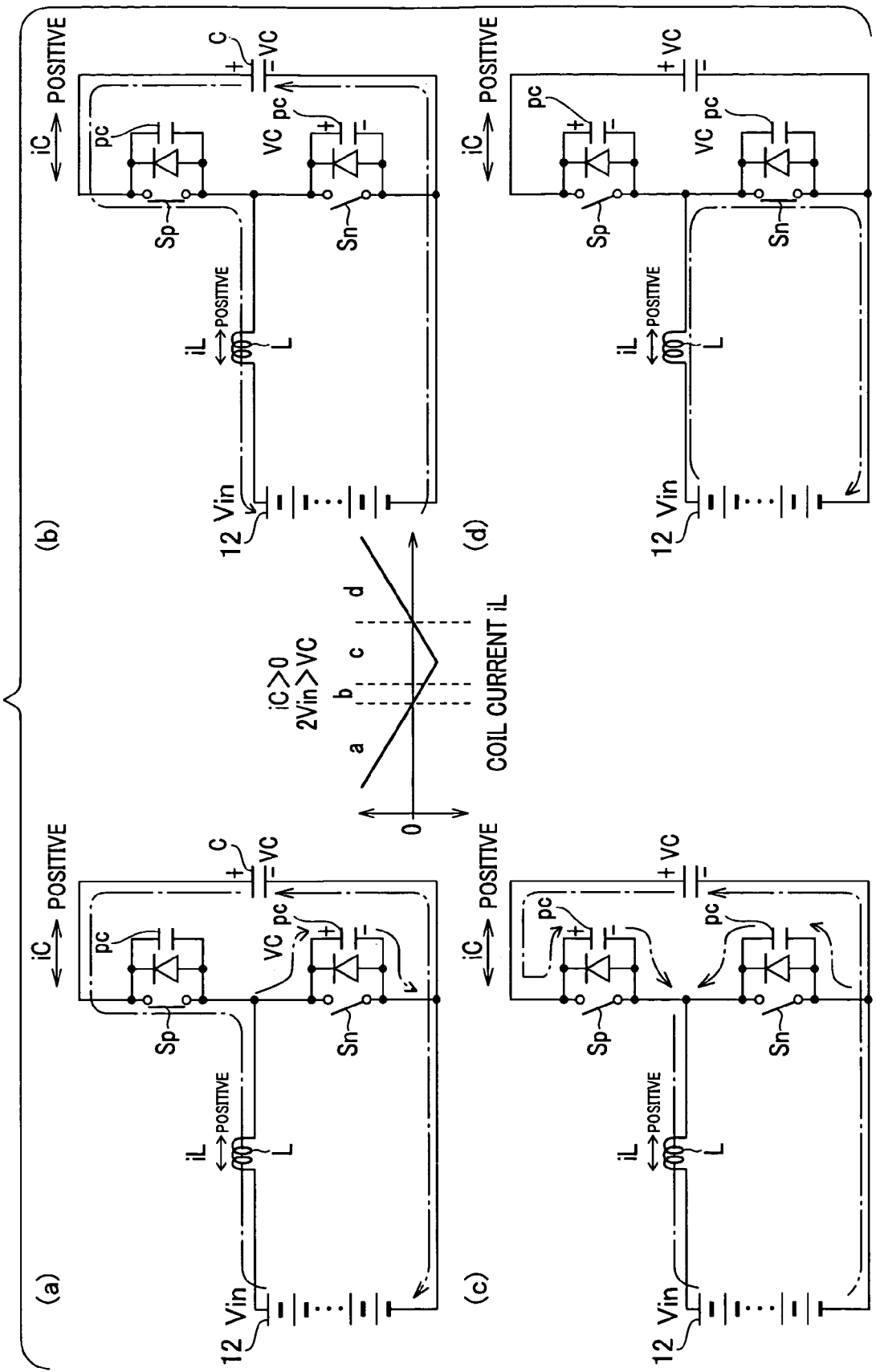
FIG. 21 is a view illustrating a mode of soft-switching processing, according to the fifth embodiment.
Figure 22:
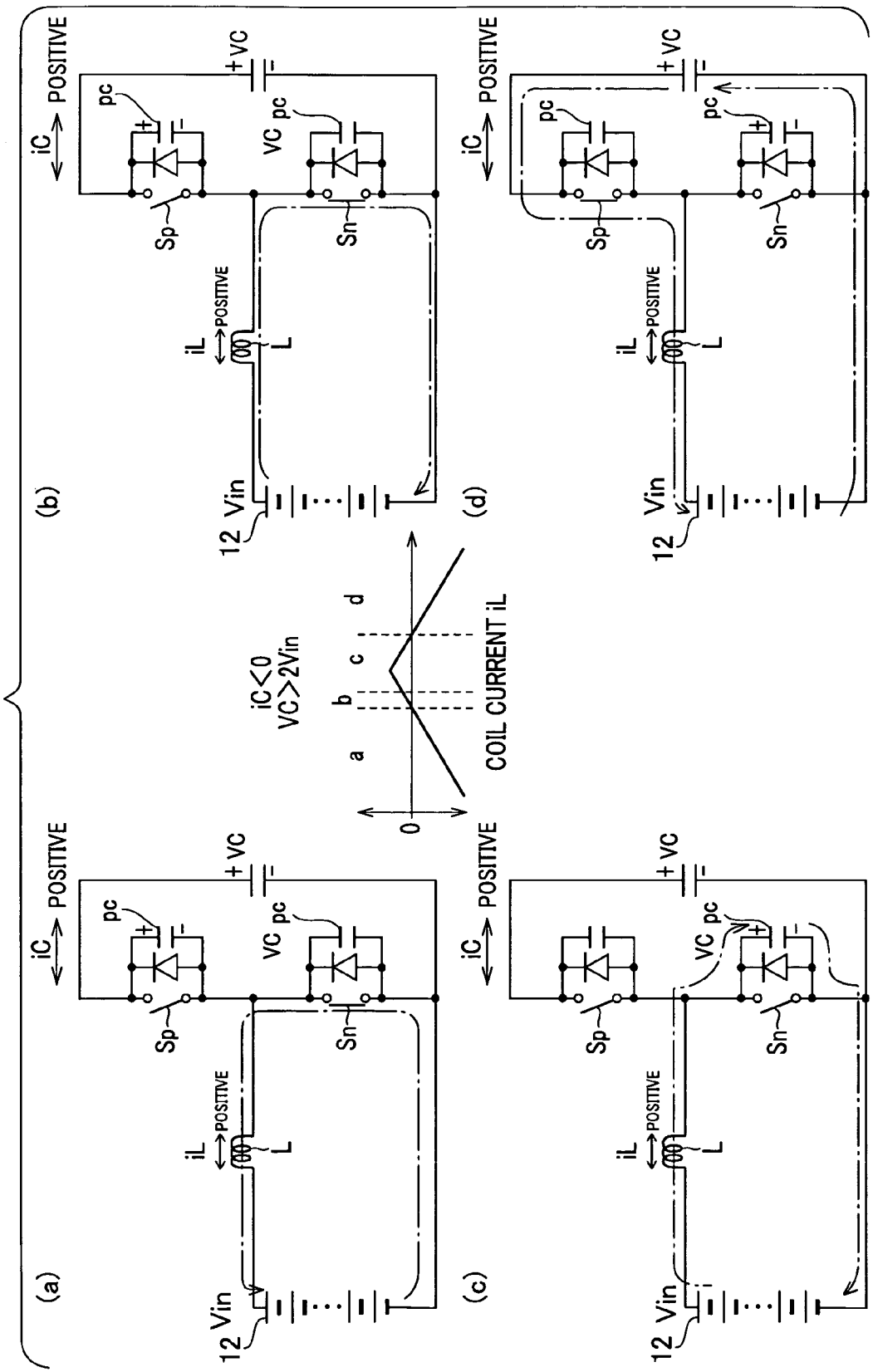
FIG. 22 is a view illustrating a mode of soft-switching processing, according to the fifth embodiment.

With reference to FIGS. 20 to 22, hereinafter is described a fifth embodiment.

The fifth embodiment is described below, referring to the figures and focusing on the differences from the first embodiment.

FIG. 20 is a schematic diagram illustrating a system according to the present embodiment. In FIG. 20, the members corresponding to those shown in FIG. 1 are allocated with the same reference symbols, for the sake of convenience.

As shown, boost converters are used as DC-DC converters in the present embodiment to configure the TCV 14. In particular, phase "U" includes the capacitor Cu, serially connected switching elements Sup, Sun which are parallelly connected to the capacitor Cu, and the coil Lu that connects a node between the switching elements Sup, Sun to the positive side of the high-voltage battery 12. In the DC-DC converter, diodes Dup, Dun are parallelly connected to the switching elements Sup, Sun, respectively. In the TCV 14, each of phases "V" and "W" is also configured, being provided with a DC-DC converter configured in the similar manner.

FIG. 21 shows a mode of switching control in the case where the output current "iC" is positive and the voltage "VC" of the capacitor C is smaller than twice of the input voltage "Vin". In the present embodiment as well, the output current "iC" is defined, in each DC-DC converter, as the current passed from a circuit other than the capacitor C, to the capacitor C. FIG. 21 uses reference symbols removed with alphabets corresponding to phases from the reference symbols of the individual elements. In particular, for example, the switching elements Sup, Svp, Swp are represented by a switching element Sp.

In the present embodiment, a requirement "2·Vin>VC" corresponds to the requirement that may not enable zero-volt switching by only providing a predetermined standby time after the current "iL" of the coil L has been zeroed but preceding the ON operation of the output voltage control switching element Sn. Therefore, energy loading process is performed as follows.

As shown in FIG. 21 by (a), the energy loading switching element Sp is in an ON state even when the output voltage control switching element Sn has been turned OFF to thereby gradually decrease the absolute value of the current passing through the coil L. Then, as shown in FIG. 21 by (b), even after the current passing through the coil L has been zeroed, the energy loading switching element Sp is retained in an ON state up until the expiration of the retention time "Δt" which is calculated in the same manner as exemplified in the first embodiment. Thus, the current "iL" of the coil L flows in the direction which is opposite to the direction of the flow at the time point when the current "iL" is zeroed, and the absolute value is gradually increased. Then, as shown in FIG. 21 by (c), by turning OFF both of the switching elements Sp, Sn after the expiration of the retention time, the charges of the parasitic capacitor pc of the output voltage control switching element Sn can be reliably extracted. Therefore, as shown in FIG. 21 by (d), the output voltage control switching element Sn can be subjected to zero-volt switching.

On the other hand, FIG. 22 shows a mode of switching control in the case where the output current "iC" is negative and the voltage "VC" of the capacitor C is larger than twice of the input voltage "Vin". FIG. 22 also uses reference symbols removed with alphabets corresponding to phases from the reference symbols of the individual elements.

In the present embodiment, a requirement "2·Vin>VC" corresponds to a requirement that may not enable zero-volt switching by only providing a predetermined standby time after the current "iL" of the coil L has been zeroed but preceding the ON operation of the output voltage control switching element Sp. Therefore, energy loading process is performed as follows.

As shown in FIG. 22 by (a), the energy loading switching element Sn is in an ON state even when the output voltage control switching element Sp has been turned OFF to thereby gradually decrease the absolute value of the current passing through the coil L. Then, as shown in FIG. 22 by (b), even after the current passing through the coil L has been zeroed, the energy loading switching element Sn is retained in an ON state up until the expiration of the retention time "Δt" which is calculated in the same manner as exemplified in the first embodiment. Thus, the current "iL" of the coil L flows in the direction which is opposite to the direction of the flow at the time point when the current "iL" is zeroed, and the absolute value is gradually increased. Then, as shown in FIG. 22 by (c), by turning OFF both of the switching elements Sp, Sn after the expiration of the retention time "Δt", the charges of the parasitic capacitor pc of the output voltage control switching element Sp can be reliably extracted. Therefore, as shown in FIG. 22 by (d), the output voltage control switching element Sp can be subjected to zero-volt switching.

Sixth Embodiment

Figure 23:
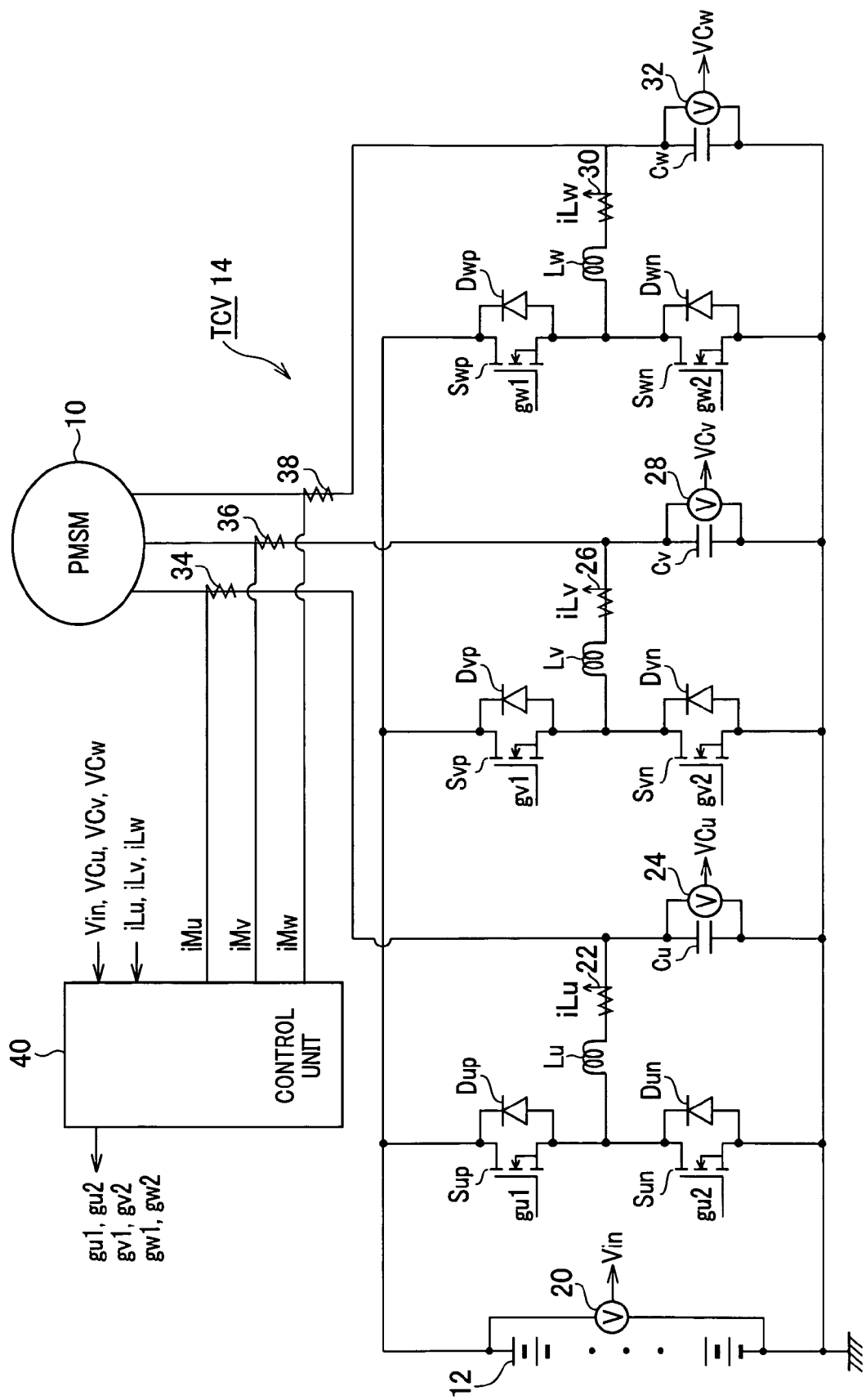
FIG. 23 is a schematic diagram illustrating a system, according to a sixth embodiment of the present invention.
Figure 24:
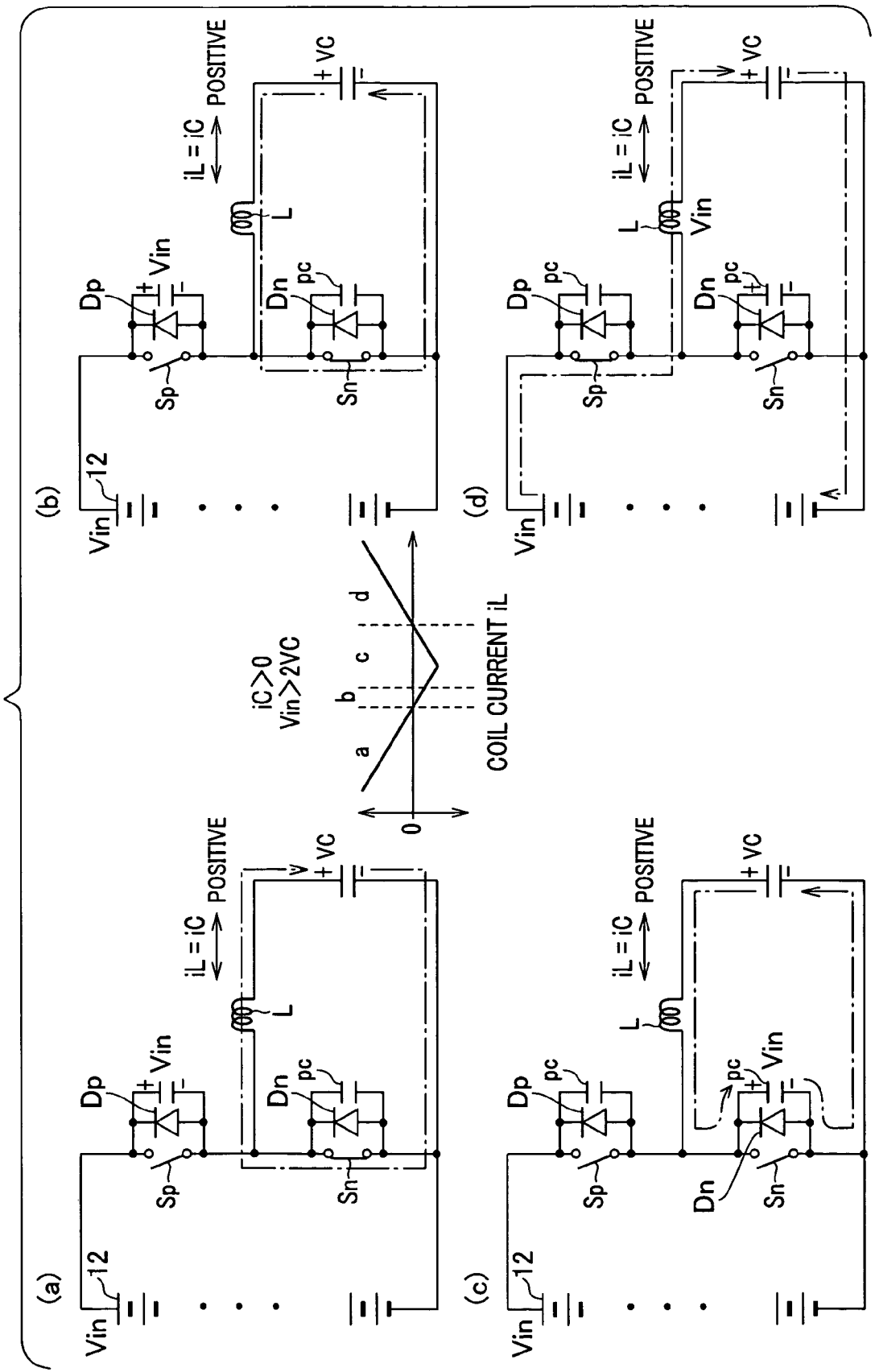
FIG. 24 is a view illustrating a mode of soft-switching processing, according to the sixth embodiment.
Figure 25:
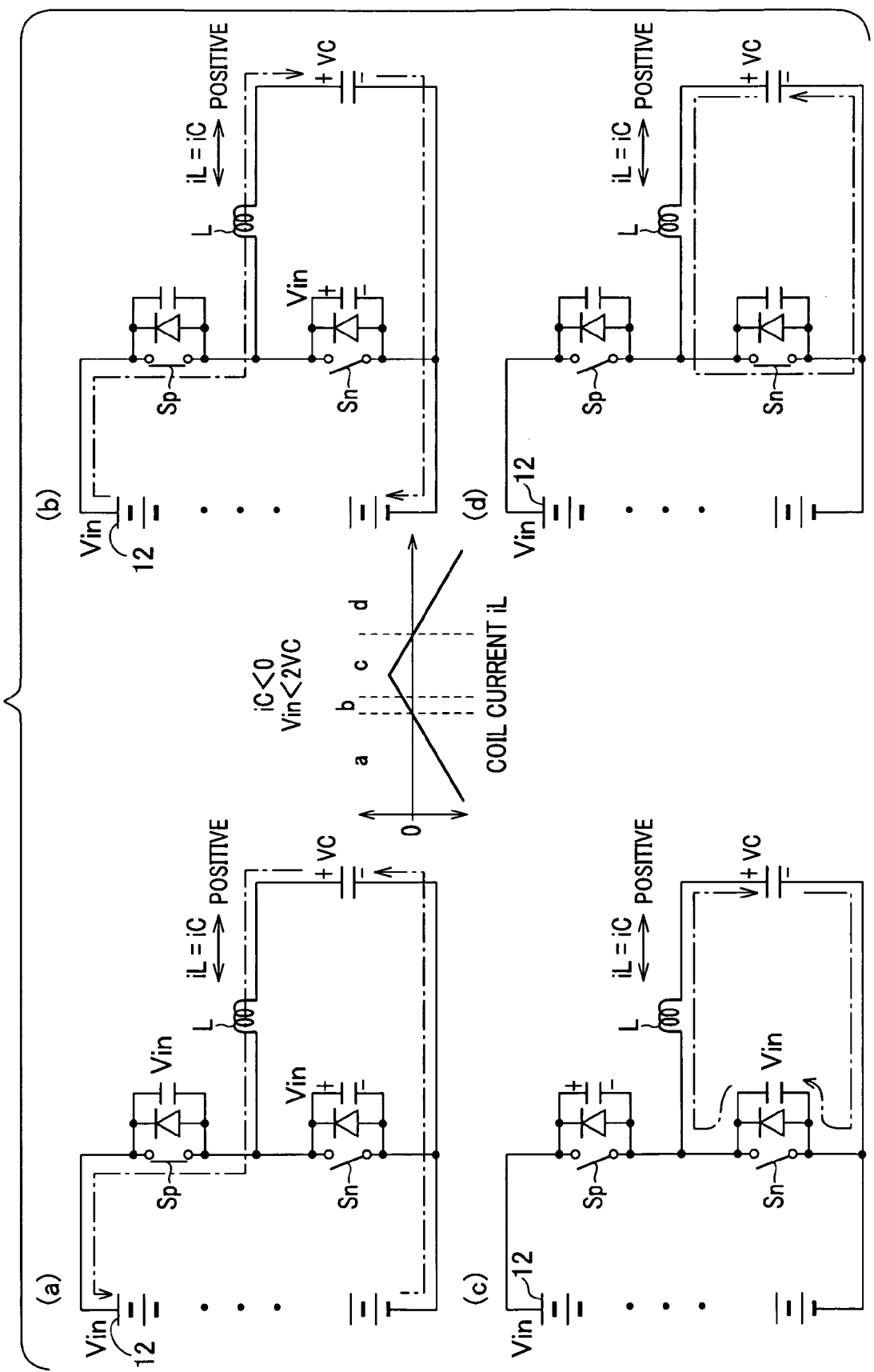
FIG. 25 is a view illustrating a mode of soft-switching processing, according to the sixth embodiment.

Referring to FIGS. 23 to 25, hereinafter is described a sixth embodiment according to the present invention.

The sixth embodiment is described below, referring to the figures and focusing on the differences from the first embodiment.

FIG. 23 is a schematic diagram illustrating a system according to the present embodiment. In FIG. 23, the members corresponding to those shown in FIG. 1 are allocated with the same references, for the sake of convenience.

As shown, back-boost converters are used as DC-DC converters in the present embodiment to configure the TCV 14. In particular, phase "U" includes the capacitor Cu, serially connected switching elements Sup, Sun which are parallelly connected to the high-voltage battery 12, and the coil Lu that connects a node between the switching elements Sup, Sun to a node between the capacitor Cu and a terminal (phase "U") of the motor 10. In the DC-DC converter, diodes Dup, Dun are parallelly connected to the switching elements Sup, Sun, respectively. In the TCV 14, each of phases "V" and "W" is also configured, being provided with a DC-DC converter configured in the similar manner.

FIG. 24 shows a mode of switching control in the case where the output current "iC" is positive and the input voltage "Vin" is larger than twice of the voltage "VC" of the capacitor C. In the present embodiment as well, the output current "iC" is defined, in each DC-DC converter, as the current passed from a circuit other than the capacitor C, to the capacitor C. FIG. 22 uses reference symbols removed with alphabets corresponding to phases from the reference symbols of the individual elements. In particular, for example, the switching elements Sup, Svp, Swp are represented by a switching element Sp.

In the present embodiment, a requirement "Vin>2·VC" corresponds to a requirement that may not enable zero-volt switching by only providing a predetermined standby time after the current "iL" of the coil L has been zeroed but preceding the ON operation of the output voltage control switching element Sp. Therefore, energy loading process is performed as follows.

As shown in FIG. 24 by (a), the energy loading switching element Sn is in an ON state even when the output voltage control switching element Sp has been turned OFF to thereby gradually decrease the absolute value of the current passing through the coil L. Then, as shown in FIG. 24 by (b), even after the current passing through the coil L has been zeroed, the energy loading switching element Sn is retained in an ON state up until the expiration of the retention time "$\Delta t$" which is calculated in the same manner as exemplified in the first embodiment. Thus, the current "iL" of the coil L flows in the direction which is opposite to the direction of the flow at the time point when the current "iL" is zeroed, and the absolute value is gradually increased. Then, as shown in FIG. 24 by (c), by turning OFF both of the switching elements Sp, Sn after the expiration of the retention time "$\Delta t$", the charges of the parasitic capacitor pc of the output voltage control switching element Sp can be reliably extracted. Therefore, as shown in FIG. 24 by (d), the output voltage control switching element Sp can be subjected to zero-volt switching.

On the other hand, FIG. 25 shows a mode of switching control in the case where the output current "iC" is negative and the input voltage "Vin" is smaller than twice of the voltage "VC" of the capacitor C. FIG. 25 uses reference symbols removed with alphabets corresponding to phases from the reference symbols of the individual elements.

In the present embodiment, a requirement "Vin<2·VC" corresponds to a requirement that may not enable zero-volt switching by only providing a predetermined standby time after the current "iL" of the coil L has been zeroed but preceding the ON operation of the output voltage control switching element Sn. Therefore, energy loading process is performed as follows.

As shown in FIG. 25 by (a), the energy loading switching element Sp is in an ON state even when the output voltage control switching element Sn has been turned OFF to thereby gradually decrease the absolute value of the current passing through the coil L. Then, as shown in FIG. 25 by (b), even after the current passing through the coil L has been zeroed, the energy loading switching element Sp is retained in an ON state up until the expiration of the retention time "$\Delta t$" which is calculated in the same manner as exemplified in the first embodiment. Thus, the current "iL" of the coil L flows in the direction which is opposite to the direction of the flow at the time point when the current "iL" is zeroed, and the absolute value is gradually increased. Then, as shown in FIG. 25 by (c), by turning OFF both of the switching elements Sp, Sn after the expiration of the retention time "$\Delta t$", the charges of the parasitic capacitor pc of the output voltage control switching element Sn can be reliably extracted. Therefore, as shown in FIG. 25 by (d), the output voltage control switching element Sn can be subjected to zero-volt switching.

Other Embodiments

The embodiments described above may be implemented with the following modifications.

The fourth to sixth embodiments may be modified in accordance with the modifications of the second and third embodiments based on the first embodiment.

In the above embodiments, the timing of ON operation of the output voltage control switching element has been the time point when the coil current "iL" has been zeroed, but this is not intended to impose a limitation. For example, the time may be estimated, which time is required from when both the output voltage control switching element and the energy loading switching element have been turned OFF, up to when the charges of the parasitic capacitor of the control switching element will have been zeroed. Then, the time point when the estimated time has expired may be used as the timing of ON operation.

In the above embodiments, the energy loading switching element has been turned ON after expiration of the dead time following the OFF operation of the output voltage control switching element, in order to complementarily bring the energy loading switching element and the output voltage control switching element into an ON state. This however is not intended to impose a limitation. For example, the energy loading switching element may be turned ON at optional timing during the OFF state of the output voltage control switching element. Here, in particular, the energy loading switching element may be turned ON when the current "iL" of the coil is zeroed.

In the above embodiments, an energy loading switching element has been assigned, depending on which of the control switching elements has been selected. This however is not intended to impose a limitation. For example, an energy loading switching element may be assigned based on the output command value "iCc".

In the above embodiments, the parasitic capacitors of the switching elements have been regarded as being of the same capacity. This however is not intended to impose a limitation. However, if the capacity is different between the capacitors, the calculation method for the retention time "$\Delta t$" may desirably be changed, according to the capacity.

The present invention has been applied to the above embodiments for the purpose of zeroing the charged voltage of the parasitic capacitors of the switching elements. This however is not intended to impose a limitation. For example, the application of the present invention is effective in zeroing the charged voltage of a capacitor (and a parasitic capacitor) even in a power conversion circuit in which the capacitor is parallelly connected to a switching element. In particular, in the case of using such a snubber capacitor (separate capacitor), the retention time "$\Delta t$" can be calculated based on the capacity of the snubber capacitor, if the capacity of the parasitic capacitor is ignorable comparing with the capacity of the snubber capacitor. Since the voltage dependency is ignorable as to the electrostatic capacity of such a snubber capacitor, calculation of the retention time can be readily performed.

The method of feedback control for the voltages "VCu", "VCv", "VCw" of the capacitor C is not limited to the proportional control described above. For example, proportional-plus-integral control, proportional-plus-integral-plus-derivative control, or the like may be used.

The method for calculating the output command values "iCuc", "iCvc", "iCwc" based on the command voltage for the motor 10, is not limited to the calculation, as described above, which is based on the difference between the command voltages "Vuc", "Vvc", "Vwc" and the voltages "VCu", "VCv", "VCw" of the capacitors C. For example, the output command values may be calculated based on the amount of change of the command voltages "Vuc", "Vvc", "Vwc", in light of the fact that the amount of change is correlated to the amount of charges requested to the capacitors Cu, Cv, Cw. In this case as well, if the existing phase currents "iMu", "iMv", "iMw" are to be considered, the output command values "iCuc", "iCvc", "iCwc" can be appropriately calculated even in the case where the power factor is variable in controlling the motor 10. For example, such open-loop control may include feedforward control. In the feedforward control, the voltages of the capacitors Cu, Cv, Cw may be calculated based, for example, on the existing phase currents "iMu", "iMv", "iMw", foregone output command values "iCuc", "iCvc", "iCwc" or the like, and the capacities of the capacitors Cu, Cv, Cw, so that the calculated voltages will be the command voltages "Vuc", "Vvc", "Vwc". Further, feedforward control may be combined with feedback control for feedback correction of the feedforward control.

The command voltages "Vuc", "Vvc", "Vwc" are not limited to the ones calculated based on the d-q axis command currents "idc", "iqc". For example, in the case of controlling the rotational speed of the motor 10 in conformity with command values, command voltages may be calculated based on the difference between the actual rotational speed and each of the command values.

The means for calculating the output command values "iCuc", "iCvc", "iCwc" based on the command voltages "Vuc", "Vvc", "Vwc" is not limited to the one using the currents passing through the individual phases of the motor 10, as direct parameters. For example, in the case where the control for fixing power factor is performed, the output command values "iCuc", "iCvc", "iCwc" may be calculated based on the command voltages "Vuc", "Vvc", "Vwc" without using the currents passing through the motor 10 as direct input parameters. This is because the command voltages "Vuc", "Vvc", "Vwc" include the phase information of the currents passing through the motor 10.

The TCV is not limited to the one provided with non-insulated type converters connected to the respective phases of the motor 10. For example, a TCV having insulated-type converters may be used.

The rotary machine is not limited to a three-phase motor, but may, for example, be a single- or five-phase motor. In this case, a power conversion circuit having one DC-DC converter per phase (terminal) may be used instead of the TCV. Also, the rotary machine may be an electric generator instead of a motor.

In the above embodiments, the TCV has been connected to a rotary machine as a motive power generator for a hybrid vehicle. Alternative to this, the TCV may be connected to a rotary machine of an electric vehicle.

The TCV is not limited to the one connected to a rotary machine serving as a motive power generator for a vehicle, but may be connected to a motor loaded on an air conditioner.

The power conversion circuit is not limited to the one connected to the terminals of a rotary machine. For example, the power conversion circuit may be a booster circuit which boosts the input voltage of an inverter for a high-voltage battery, the inverter being connected to an on-vehicle rotary machine. In such a case, a case may be assumed, where no output command value "iCc" is set. In such a case, for example, the output voltage control switching element and the energy loading switching element may be selected based on the actual output current "iC".

What is claimed is:

1. A drive controller for controlling driving of a power conversion circuit comprising a switching element for increasing/decreasing an absolute value of current passing through a coil by repeating electrical ON/OFF operation, so that voltage of power storage unit is converted to a desired value required by power supply unit, the switching element being provided for each positive/negative polarity of output current outputted from a circuit other than the power storage unit, to the power storage unit, wherein the drive controller comprises:
    energy loading unit for loading energy on the coil through a switching element not corresponding to existing polarity of the output current, after the absolute value has been zeroed by the turn OFF of the switching element corresponding to the existing polarity, but preceding an ON operation of the switching element corresponding to the existing polarity; and
    OFF-state setting unit for turning OFF both of the switching elements corresponding to and not corresponding to the existing polarity, after an energy loading process.

2. The drive controller according to claim 1, wherein:
    the controller further comprises polarity determining unit for determining polarity of the output current.

3. The drive controller, according to claim 1, wherein:
    the energy loading unit is configured to load energy on the coil to zero the voltage applied across input/output terminals of a switching element corresponding to the existing polarity, when the switching element is switched from an OFF state to an ON state.

4. The drive controller according to claim 1, wherein:
    the energy loading unit is configured to perform a process for loading energy on the coil, based on the a voltage of the power supply unit and the voltage of the power storage unit.

5. The drive controller according to claim 1, wherein:
    the energy loading unit comprises setting unit for setting time for retaining an ON state of the switching element not corresponding to the existing polarity of the output current, starting from a time point when the absolute value has been zeroed by the turn OFF of the switching element corresponding to the existing polarity.

6. The drive controller according to claim 5, wherein:
    the power conversion circuit comprises a pair of serially connected switching elements corresponding to respective polarities of the output current;
    voltage across input/output terminals of the switching element corresponding to the existing polarity is set so as to be zeroed, by charged voltage of capacitor components parallel to the input/output terminals of the switching element not corresponding to the existing polarity, preceding the switching of the switching element corresponding to the existing polarity from an ON state to an OFF state; and
    the energy loading unit is configured to load energy for extracting charges from the capacitor components parallel to the input/output terminals of the switching element corresponding to the existing polarity, when the switching element is switched from an OFF state to an ON state.

7. The drive controller according to claim 5, wherein a switching element corresponding to the existing polarity is configured to be switched to an ON state when current passing through the coil is zeroed, following turn OFF of the switching elements by the OFF-state setting unit.

8. The drive controller according to claim 5, wherein:
    the controller comprises unit for switching the switching element not corresponding to the existing polarity to an ON state, during a period when the switching element corresponding to the existing polarity is in an OFF state.

9. The drive controller according to claim 5, wherein:
each of the switching elements is operated based on a command value of the output current.

10. The drive controller according to claim 5, wherein:
the power storage unit is connected to a terminal of a rotary machine; and
the controller further comprises:
   current command value calculating unit for calculating a command value of the output current, based on command voltage for the rotary machine; and
   operating unit for operating each of the switching elements, based on the command value of the output current.

11. The drive controller according to claim 5, wherein:
the power conversion circuit is configured by being provided with non-insulated type converters.

12. The drive controller according to claim 11, wherein:
the non-insulated type converters are back-boost converters each comprising: a pair of switching elements connected parallel to the power supply unit; and a coil for connecting a node between the switching elements to the power storage unit.

13. The drive controller according to claim 11, wherein:
the non-insulated type converters are back-boost converters each comprising: a pair of switching elements connected parallel to the power storage mea unit; and a coil for connecting a node between the switching elements to the power supply unit.

14. The drive controller according to claim 11, wherein:
the non-insulated type converters are back-boost converters each comprising: a pair of switching elements connecting between one terminal of the power storage unit and one terminal of the power supply unit; and a coil connecting a node between the pair of switching elements to the other terminal of the power storage unit and to the other terminal of the power supply unit.

15. The drive controller according to claim 11, wherein:
the non-insulated type converters are back-boost converters each comprising: a pair of switching elements connected parallel to the power supply unit; a pair of switching elements connected parallel to the power storage unit; and a coil connecting a node between the pair of switching elements connected parallel to the power supply unit to a node between the pair of switching elements connected parallel to the power storage unit.

16. The drive controller according to claim 5, wherein:
the energy loading unit is configured to perform a process for loading energy on the coil, based on a voltage of the power supply unit and the voltage of the power storage unit.

17. The drive controller according to claim 5, wherein:
the controller further comprises polarity determining unit for determining polarity of the output current.

18. The drive controller, according to claim 5, wherein:
the energy loading unit is configured to load energy on the coil to zero the voltage applied across input/output terminals of a switching element corresponding to the existing polarity, when the switching element is switched from an OFF state to an ON state.

19. A drive control system, comprising:
a power conversion circuit comprising a switching element for increasing/decreasing an absolute value of current passing through a coil by repeating electrical ON/OFF operation, so that voltage of power storage unit is converted to a desired value required by power supply unit, the switching element being provided for each positive/negative polarity of output current outputted from a circuit other than the power storage unit, to the power storage unit; and
a drive controller for controlling driving of the power conversion circuit,
wherein the drive controller comprises:
   energy loading unit for loading energy on the coil through a switching element not corresponding to existing polarity of the output current, after the absolute value has been zeroed by the turn OFF of the switching element corresponding to the existing polarity, but preceding an ON operation of the switching element corresponding to the existing polarity; and
   OFF-state setting unit for turning OFF both of the switching elements corresponding to and not corresponding to the existing polarity, after an energy loading process.

* * * * *